US009055121B2

(12) United States Patent
Rajakarunanayake et al.

(10) Patent No.: US 9,055,121 B2
(45) Date of Patent: Jun. 9, 2015

(54) SOCIAL PROCESSING MEMBER OFFERING FIXED AND INTELLIGENT SERVICES

(75) Inventors: Yasantha N. Rajakarunanayake, San Ramon, CA (US); James D. Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 119 days.

(21) Appl. No.: 13/484,624

(22) Filed: May 31, 2012

(65) Prior Publication Data

US 2013/0091551 A1  Apr. 11, 2013

Related U.S. Application Data

(63) Continuation-in-part of application No. 13/342,301, filed on Jan. 3, 2012, and a continuation-in-part of application No. 13/408,624, filed on May 31, 2012, and a continuation-in-part of application No. 13/436,557, filed on Mar. 30, 2012, and a continuation-in-part of application No. 13/408,986, filed on Feb. 29, 2012, and a continuation-in-part of application No. 13/351,822, filed on Jan. 17, 2012.

(60) Provisional application No. 61/545,147, filed on Oct. 8, 2011.

(51) Int. Cl.
| *G06F 15/16* | (2006.01) |
| *H04L 29/08* | (2006.01) |
| *H04W 4/20* | (2009.01) |
| *G06Q 10/00* | (2012.01) |
| *H04L 12/18* | (2006.01) |
| *H04L 12/58* | (2006.01) |

(52) U.S. Cl.
CPC ............ *H04L 67/306* (2013.01); *H04L 51/32* (2013.01); *H04W 4/206* (2013.01); *G06Q 10/00* (2013.01); *H04L 67/303* (2013.01); *H04L 12/185* (2013.01)

(58) Field of Classification Search
USPC .......................... 709/203, 204, 206, 219, 229
See application file for complete search history.

(56) References Cited

U.S. PATENT DOCUMENTS

| 8,495,197 | B1* | 7/2013 | Nagargadde et al. | ......... 709/223 |
| 8,554,891 | B2* | 10/2013 | Capobianco | .................. 709/223 |
| 8,639,785 | B2* | 1/2014 | Kiley et al. | .................... 709/220 |
| 2007/0233672 | A1* | 10/2007 | Sanfacon et al. | ................. 707/5 |
| 2009/0292814 | A1* | 11/2009 | Ting et al. | ..................... 709/229 |
| 2010/0005518 | A1* | 1/2010 | Tirpak et al. | ..................... 726/6 |
| 2010/0035597 | A1* | 2/2010 | Rao | .............................. 455/419 |

(Continued)

*Primary Examiner* — Thu Ha Nguyen
(74) *Attorney, Agent, or Firm* — Garlick & Markison; Bruce E. Garlick

(57) ABSTRACT

A social networking system offers a variety of fixed and intelligent services and social device resources participating as members in a social network (SNET) group. Such members may include, for example, social billing and payment services, digital assistants and artificial intelligence functions, robotic control and training services, media content storage and playback services, data backup services, services that support distributed processes such as distributed research projects, networking elements such as network attached storage (NAS), firewalls, proxies, etc. In various embodiments, such services and resources may become available upon being selectively docked or otherwise associated (e.g., through docking of a supporting device) with a SNET group by a human member or third party via a docked user device. Selection of available services may be supported through a visual menu provided by a member device or support service.

20 Claims, 17 Drawing Sheets

(56) References Cited

U.S. PATENT DOCUMENTS

| | | | |
|---|---|---|---|
| 2010/0169161 A1* | 7/2010 | Sacco | 705/10 |
| 2011/0087877 A1* | 4/2011 | Dagg et al. | 713/150 |
| 2011/0238735 A1* | 9/2011 | Gharpure et al. | 709/203 |
| 2011/0258275 A1* | 10/2011 | Rao | 709/206 |
| 2011/0307553 A1* | 12/2011 | Ghang et al. | 709/204 |
| 2012/0163574 A1* | 6/2012 | Gundotra et al. | 379/114.03 |
| 2012/0166255 A1* | 6/2012 | Rizk | 705/12 |
| 2012/0191776 A1* | 7/2012 | Ruffner et al. | 709/204 |
| 2012/0209910 A1* | 8/2012 | Svendsen et al. | 709/204 |
| 2012/0250843 A1* | 10/2012 | Belz et al. | 379/93.17 |
| 2013/0004935 A1* | 1/2013 | Smith et al. | 434/365 |
| 2013/0080592 A1* | 3/2013 | Budd et al. | 709/219 |
| 2013/0091211 A1* | 4/2013 | Diab et al. | 709/204 |
| 2013/0091442 A1* | 4/2013 | Diab | 715/753 |
| 2013/0151515 A1* | 6/2013 | Davis et al. | 707/736 |
| 2013/0227020 A1* | 8/2013 | Ruffner et al. | 709/204 |
| 2013/0243342 A1* | 9/2013 | Houjou, Yoshiharu | 382/224 |
| 2014/0059660 A1* | 2/2014 | Marra et al. | 726/5 |

* cited by examiner

Social Networking Grouping Hierarchy 800

SOCIAL PROCESSING MEMBER OFFERING FIXED AND INTELLIGENT SERVICES

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 61/545,147, entitled "Social Network Device Memberships and Resource Allocation", filed Oct. 8, 2011, which is hereby incorporated herein by reference in its entirety and made part of the present U.S. Utility Patent Application for all purposes.

Continuation-in-part (CIP) Priority Claim, 35 U.S.C. §120

The present U.S. Utility Patent Application claims priority pursuant to 35 U.S.C. §120 as a continuation-in-part of the following U.S. Utility Applications, all of which are hereby incorporated herein by reference in their entirety and made part of the present U.S. Utility Patent Application for all purposes:

1. U.S. Utility application Ser. No. 13/342,301, entitled "Social Network Device Memberships and Applications," filed Jan. 3, 2012, which claims priority pursuant to 35 U.S.C. §119(e) to U.S. Provisional Application No. 61/545,147, entitled "Social Network Device Memberships and Resource Allocation," filed Oct. 8, 2011.

2. U.S. Utility application Ser. No. 13/408,986, entitled "Social Device Resource Management," filed Feb. 29, 2012, which claims priority pursuant to 35 U.S.C. §119(e) to U.S. Provisional Application No. 61/545,147, entitled "Social Network Device Memberships and Resource Allocation," filed Oct. 8, 2011.

3. U.S. Utility application Ser. No. 13/436,557, entitled "Social Networking Grouping Hierarchy" filed Mar. 30, 2012, which in turn is a continuation-in-part of U.S. Utility application Ser. No. 13/342,301, entitled "Social Network Device Memberships and Applications," filed Jan. 3, 2012, U.S. Utility application Ser. No. 13/408,986, entitled "Social Device Resource Management," filed Feb. 29, 2012, and U.S. Utility application Ser. No. 13/351,822, entitled "Ad Hoc Social Networking," filed Jan. 17, 2012, all of which in turn claim priority pursuant to 35 U.S.C. §119(e) to U.S. Provisional Application No. 61/545,147, entitled "Social Network Device Memberships and Resource Allocation," filed Oct. 8, 2011.

BACKGROUND OF THE INVENTION

1. Technical Field of the Invention

The invention relates generally to social networking; and, more particularly, it relates to social network device memberships, resource allocation, and service offerings.

2. Description of Related Art

The popularity and growth of social network sites and services has increased dramatically over the last few years. Present social network sites include Facebook®, Google+®, Twitter®, MySpace®, YouTube®, LinkedIn®, Flicker®, MYUBO™, Bebo® and the like. Such social networking (SNET) sites are typically web-based and organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to view profiles, communicate and share activities, interests, opinions, status updates, audio/video content, etc., across networks of contacts. Social networking services might also allow members to track certain activities of other members of the social network, collaborate, locate and connect with existing friends, former acquaintances and colleagues, and establish new connections with other members.

Individual members typically connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

In so-called "cloud" computing, computing tasks are performed on remote computers/servers which are typically accessed via Internet connections. One benefit of cloud computing is that may reduce the relative processing and storage capabilities required by user devices (e.g., a cloud computer may load a webpage accessed by a tablet device and communicate only required information back to the tablet). Accordingly, recent years have witnessed an ever-growing amount of content and application software being migrated from local or on-site storage to cloud-based data storage and management. Such software functionality/services and content are typically available on-demand via (virtualized) network infrastructures.

DETAILED DESCRIPTION OF THE INVENTION

Figure 1:
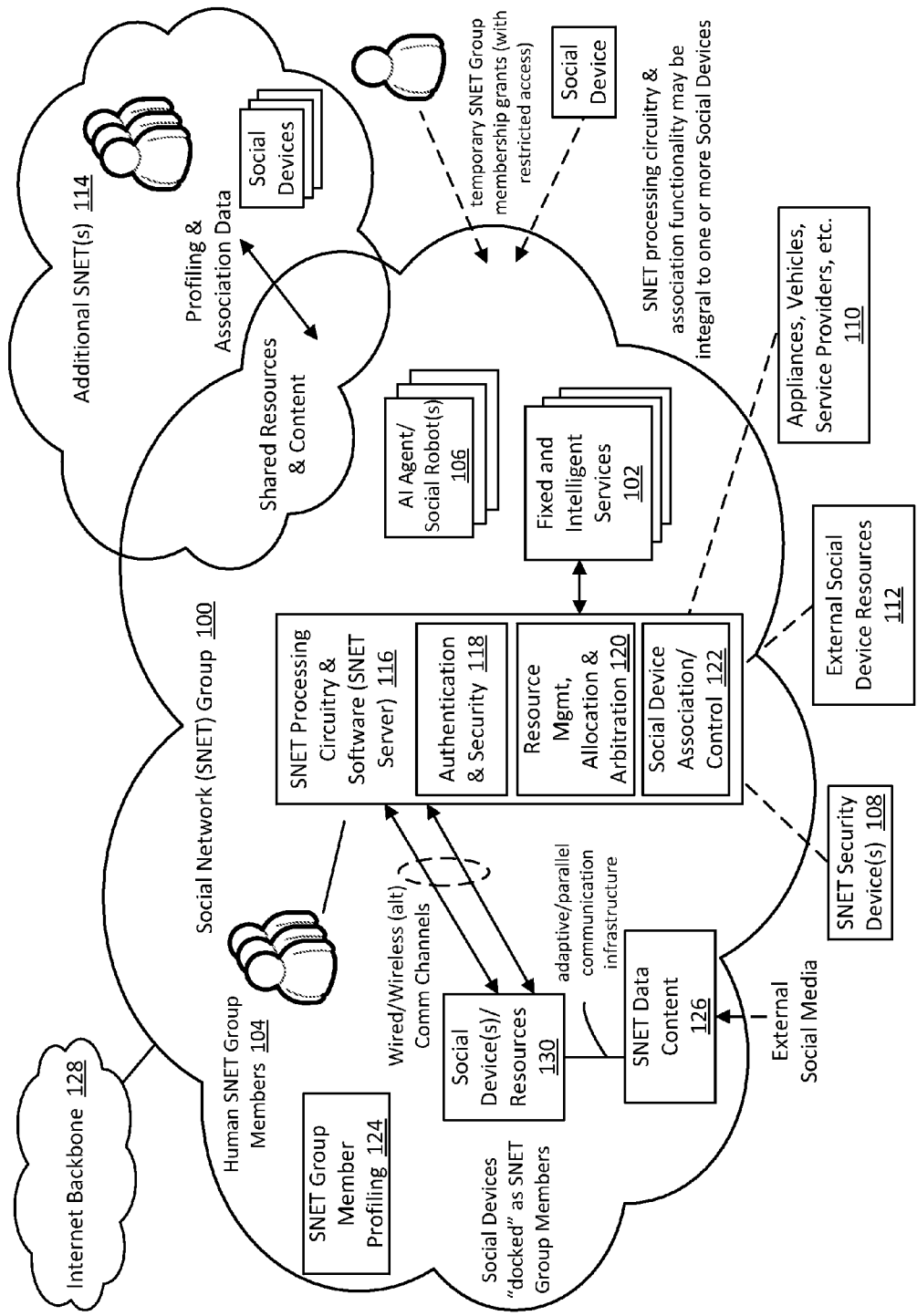
FIG. 1 illustrates a social network group comprising social services and devices in accordance with an embodiment of the disclosure.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET sub-circle", "SNET group" and "SNET sub-group" generally denote a social network that comprises social devices and, as contextually appropriate, human SNET members and personal area networks ("PANs").

Beyond traditional social networking features and services, a SNET group 100 and associated fixed and intelligent services 102, social devices/resources 130 and other capabilities according to various embodiments of the disclosure include numerous novel features and attributes as described more fully below and with general reference to FIG. 1. Briefly, in one embodiment of the disclosure, a variety of conventional services and resources provided outside of SNET contexts may be included (in addition to human and device members) in a SNET group or sub-group, including computing and networking devices, application software, databases, etc. Stated another way, such a SNET group may have member participants beyond humans. Such members might comprise, for example: networking elements such as network attached storage (NAS), firewalls, proxies, VPNs, etc.; media content storage or playback and billing services; other database and storage backup services; applications; human-like services such as an artificial intelligence "digital assistant"; DRM and security elements; support functions specific to the group and/or the underlying membership; etc. Such members may have a fixed function or operate with an artificial intelligence "persona" or other intelligence capabilities. Further, an artificial persona or avatar that behaves as a friend or facilitates SNET group usage or training might be selected to participate as a member. Such concepts may be extended to add an individual's "personification" overlay (video, appearance, voice, etc.) on top of such persona/avatar, which may operate when the individual is offline.

For example, a SNET may offer a series of functional members that become available upon docking of a particular supporting device. Such functional members may be visible and available across a user(s) SNET account, to a particular SNET group/circle, to the functional member itself, to all SNET membership, etc. Note that many such elements and functionality (e.g., temporal alarms, security and contact managers, DMZ-type applications, etc.) are described or suggested herein. By way of example, an application docked as a SNET group member may be configured automatically as a DMZ member with underlying functionality. In such an embodiment involving gaming activities, joinder of an SNET group by a gaming application and game member might result in service offerings to other SNET group members including, without limitation, configuration services based on underlying device limitations/capabilities. Similarly, docking of members may also trigger malware and virus scanning services within the SNET group, spanning through all (or a subset) of the implicated social devices, services, and software.

In another embodiment of the disclosure, payment authentication services are performed on a per-device (using a SIM card, bar code or the like) or per-SNET basis. For example, reading a bar code may trigger connection with a social network providing various options, including payment options, and/or enable another SNET member (e.g., a family member) to assume responsibility for payment of fines, fees, gaming credits, etc. In this instance, an electronic invoice can be forwarded to the SNET and/or responsible SNET member, and payment may be conducted through (low power) Bluetooth or NFC-type functionality associated with an (SNET) electronic wallet, bank account, credit card, etc. Payment may be subject to individual or circle-by-circle purchasing limits, and require one or more security/authentication steps. For example, a social member set-top box may incorporate smart/credit/debit card information and an associated billing interface, element or application/application interface to assist in performing billing transactions, including transactions involving confirmation via a separate communication pathway and/or social member (a smart phone, for example). Purchasing, payments, crediting, receipts, etc., may be conducted and communicated within a particular circle(s) via a circle/SNET member application or application interface. Security and security proxy functions may also be integrated into a social billing process according to the disclosure.

In another embodiment according to the disclosure, SNET group/circle members comprise "social" artificial intelligence functionality. Such functionality may take the form, for example, of a dockable social robot. Potential applications include traditional (factory) robot monitoring, program exchange and human-to-robot and robot-to robot-interaction via a SNET group (e.g., load sharing, support activity, data exchange, information, experience and training). Such an embodiment may be viewed as "inverting" the social network concept to computers/machines, and applying "friend" concepts, etc., for load balancing and collaboration in autonomous operating environments.

According to another embodiment of the disclosure, members within a SNET/circle may donate or expose personal device computational capacity or other resources (such as storage) to support a SNET managed process, such as distributed or peer-to-peer computing activities (for example, the search for extraterrestrial intelligence (SETI), virus decoding, etc.). Further, a SNET managed process may utilize accessible member resources for distributed, real-time backup of each member's (distributed) data. Such distributed processes and associated data can be limited to one or more SNET groups (such as a household social group with auto-docking), and may be utilized for a wide variety of other purposes such as control of a group of social "robots", etc. Similarly, content or applications/software (e.g., imaging services) residing on a docked social device may be accessed by another social device.

Referring more specifically to FIG. 1, a social network circle/group 100 (hereinafter "SNET circle" or "SNET group") comprising fixed and intelligent social services 102 is shown. Briefly, membership in the SNET group 100 may comprise fixed and intelligent services 102, docked social devices/resources 103 (embodiments of which are described in conjunction with FIGS. 7 and 17) and human SNET group members 104, as well as proxies thereof. Further, SNET group 100 nodes may include device services and software (e.g., applications) of various types participating as members. By way of example, SNET group members might include artificial intelligence agents/social robots 106, SNET security device(s) 108, appliances, vehicles and service providers 110, external social device resources 112, common or authorized members/functionality of other SNET groups, etc. Further, access to specific content and resources of a SNET group 100 may be shared with members of additional SNET(s) 114, including remote or web-based applications. Such access can be conditioned on acceptable profiling and association data. Similarly, social devices or individuals may be granted temporary or ad hoc memberships, with or without restricted access.

In the illustrated embodiment, formation, maintenance and operation of SNET group 100 is performed by standalone or distributed SNET processing circuitry and software 116. It is noted that the "SNET processing circuitry" may comprise hardware, hardware and software, hardware supported software applications, or various combinations thereof, and be configurable to support various functionalities disclosed herein. Further, the SNET processing circuitry 116 may be included in a standalone server, server farm, cloud-based resources, and/or the various types of devices described below, and incorporate authentication and security functionality 118. In addition, specialized middleware may also be utilized by SNETs according to the invention, including standardized middleware and/or standardized communication protocols having an associated certification process. Interactions and interdependencies within the SNET group 100 may involve one or more of an adaptive resource management, allocation and arbitration module 120, a social device association/control module 122, and a SNET group member profiling module 124.

As described more fully below, distribution of internal and external SNET data content 126 can be accomplished in a variety of ways in accordance with various embodiments of the disclosure. For example, data distribution may involve an adaptive or parallel network communication/routing infrastructure involving a wide variety of communication protocols and wired and/or wireless communications channels, as well as one or more social devices/resources 130. SNET data content 126 may comprise, for example, various user-driven (advertising) channels, pictures, videos, audio communications, links, online text, etc. Access to such content, as well as communications with and remote access to social devices 102 of the SNET group 100, may occur over an Internet backbone 128, cellular communication system, WAN, LAN, etc.

A member of a SNET in accordance with various embodiments of the disclosure such as those disclosed herein may establish permissions and/or privacy settings that control and restrict who or what may access the member's profile(s) information, offer services, communication resources, connections and groups, as well as define desired degrees of access. Permissions may enable the user to maintain certain resources or information as private or available on a permissive basis only. For example, accessibility to available communication resources or social content may be limited to users/devices in a particular SNET or SNET group. Alternatively, such resources may be publicly available. Likewise, a SNET member may selectively decide to permit others to access personal information such as name, gender, contact information/email address, etc.

In the various embodiments, membership in a SNET group may be extended to encompass public and private social devices and equipment. For example, in a SNET group that includes human members, each human member may have a respective personal SNET sub-group of associated or docked social devices capable of independent or aggregated participation in the SNET group. The SNET sub-group may be locally or remotely accessible by a human member and/or other SNET group/sub-group members through various means, such as clicking on an icon or tag associated with the human member/personal sub-group. A SNET group may be persistent or of limited duration, and include ad hoc and/or static associations.

Exemplary social devices may be broadly categorized as either (i) social devices that include a user or SNET group interface sufficient to provide meaningful input to SNET interaction and (ii) social devices that support minimal or no user input relevant to SNET interaction. More particularly and without limitation, the first category may include computers, tablet devices, IPTVs, IPTV set top boxes, smart phones, servers, laptops, cloudbooks, network attached storage devices, gaming consoles, media players/sources, communication nodes (access points, routers, switches, gateways, etc.), user interface devices, power line communication (PLC) devices, etc. Such social devices may receive user input for SNET setup and management. The second category may include, again without limitation, printers, projectors, cameras and camcorders, scanners, speakers, headsets, smoke detectors, alarm systems, video cameras, mice, etc. In general, dockable social devices include any electronic device that could be operably coupled to or docked in a SNET group/sub-group via wired or wireless pathways to participate as a SNET member.

As will be appreciated, by docking social devices, members of a SNET circle may gain full or partial remote control and interaction such devices via an authorized member SNET account. For example, family members authorized to participate in a "family" SNET circle may remotely access docked social devices via one or more associated SNET accounts. Exemplary methods for docking and accessing social devices are described more fully below in conjunction with numerous of the Figures.

Figure 2:
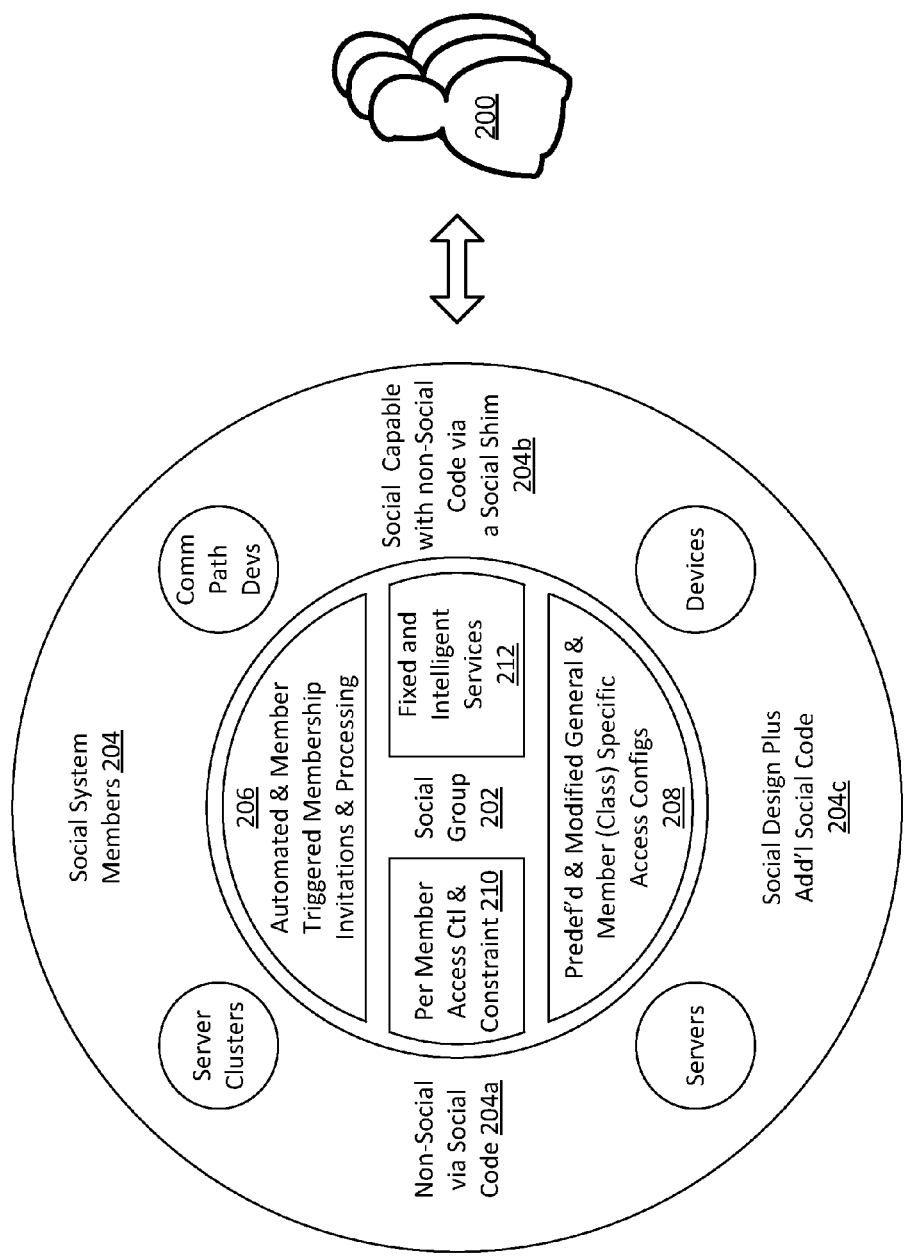
FIG. 2 illustrates a social group comprising a variety of members in accordance with an embodiment of the disclosure.

FIG. 2 illustrates an embodiment of a social group 202 comprising a variety of members in accordance with the present disclosure. In this embodiment, membership in the social group 202 may include a variety of novel social system members 204 functioning in various capacities within the social group 202. As will be understood, certain of the social system members 204 may support direct or indirect associations between the social group 202 and human members/non-members and users 200.

In the illustrated embodiment, social system members (or nodes) 204 include one or more local or remote servers and server clusters that provide a support infrastructure/supporting system for social group functionality and member operations (routing, data storage, services, dockable services, etc.). Communications within the social group and with non-members may occur via dedicated or multi-function communication path devices.

Social system members 204 further include devices configured to operate as nodes within the social group 202. Social functionality in such devices and other social system members 204 can be implemented through various means. For example, a device may have integral hardware/firmware/software to support social group access and member operations. Alternatively, a general purpose device 204*a* may include social code that enables participation in the social group 202. In a further embodiment, a device 204*b* designed to include social functionality may participate in the social group 202 through a combination of non-social code and a social shim layer or driver wrapper. In yet another embodiment, a member device 204*c* having a social design may utilize additional social code, including code specific to a social group 202.

Participation in the social group 202 is supported through functionality that includes automated and member-triggered membership invitations and processing (membership management) 206. More particularly, membership management 206 may function to invite prospective members to participate in the social group 202 through automatic, automated and member-triggered processes. For example, membership management 206 might be configured by a human user 200 to establish a social group 202 by automatically inviting/accepting social system members having certain characteristics (such as devices owned or controlled by the user or acquaintances of the user).

Processing of accepted invitations and unsolicited requests to join the social group 202 may be conditioned upon input or authorization from an existing social system member(s) 204 or human user(s) 200 (e.g., through a user interface). Similarly, membership management 206 may be configured to generate automated suggestions regarding which prospective members receive an invitation. Various other approaches, such as those described herein, can be used to establish membership in accordance with the disclosure.

Access to and visibility of resources of a social group 202, including services and data, may be managed through general and member class-specific access configurations 208. For example, if membership in the social group 202 includes family members and associated devices, a uniform access configuration (or separate device and human configurations) could be applied across the class in an automatic or automated manner. In other embodiments, access control and constraints 210 are imposed on a per-member basis.

The social group 202 may offer a wide variety of fixed and intelligent member services 212, including both internal and external services accessible by social system members 204. By way of example, the social group 202 may offer payment processing services, storage and backup services, robotic control functions, digital assistants, and other services (certain of which may themselves participate as members) between full members and/or authorized guest members and visitors. In certain embodiments, member services 212 may themselves participate or be selectable to participate as members of the social group 202. As with other resources of the social group 202, access control and constraints on member services 212 may be applied to individual members or classes of members.

Figure 3:
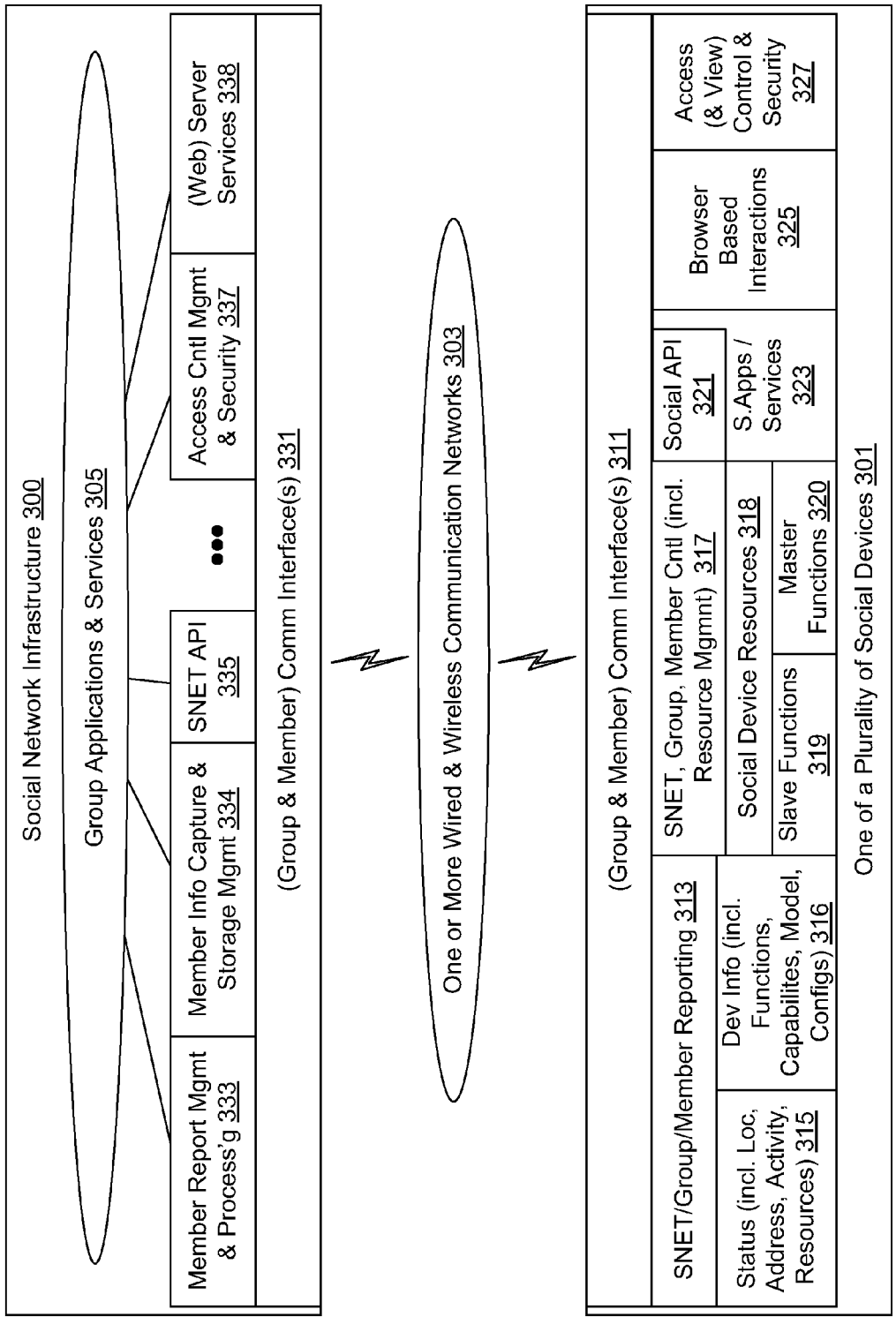
FIG. 3 is a functional block diagram illustrating a social network infrastructure and social resources/devices in accordance with an embodiment of the disclosure.

FIG. 3 is a functional block diagram illustrating a social network (SNET) infrastructure 300 and (member) social device(s) 301 in accordance with an embodiment of the disclosure. Communications between the social network infrastructure 300 social device(s) 301 and other SNET members may occur over one or more wired and wireless communication networks 303. The SNET infrastructure 300 and social device(s) 301 are coupled to the communication networks 303 by communication interface(s) 331 and 311, respectively, either of which may support communications with individual SNET members or groups/classes of SNET members.

The SNET infrastructure 300 of the illustrated embodiment includes a number of functions and resources to support formation and maintenance of a SNET having social device (and/or service) members. In particular, member report management and processing 333 receives information from SNET/group/member reporting functions 313 in associated social devices 301. Such information may include, for example, status data 315 regarding the location, address and activities of a social device 301 and/or device user.

In addition, the social device 301 may provide device information 316 indicating, for example, device functions and social capabilities, device model number(s), device configurations, software versions, attached peripherals and downstream (social) devices, device resources and usage, etc. Device information 316 relating to available resources/services and current resource usage may be utilized by the SNET infrastructure 300 for purposes of SNET resource management, including dynamic resource allocation and arbitration.

In various embodiments, the social device 301 may have an obligation to gather, store and/or report device status/information 315/316 at different times. For example, reporting may be required upon affiliation or docking with a SNET, on a periodic basis, and/or during operational engagements with other intra- and inter-SNET resources and devices (including upstream and downstream devices).

Referring again to the SNET infrastructure 300, additional functionality and resources include, without limitation: SNET member information capture and storage management 334; a SNET application programming interface (API) 335 that allows SNET associated software components to communicate with each other; security and access control management 337 for maintaining the integrity of the SNET and affiliated data/resources; and (Web) server services 338. The social network infrastructure 300 further comprises other group application services 305 corresponding to the foregoing, as well as additional services such as those described herein. In one exemplary embodiment, the SNET infrastructure 300 might determine (e.g., by means of device information 316) the category and nature of a social device 301 wishing to participate in a SNET. As necessary, functionality in the SNET infrastructure 300 could then direct or trigger installation of appropriate application software and underlying drivers in the social device 301. Such operations might be performed with minimal involvement from inherent functions of the social device 301.

In the illustrated embodiment, the social device 301 comprises a number of additional functions and resources to support participation in a social network. More particularly, SNET, SNET and/or member control functions 317 may include slave functions 318, master functions 319, and various combinations thereof. Slave functions 318 include, for example, device (re-)configuration, directed resource allocation, managed resource arbitration, bridging operations, etc. Master functions 319 enable the social device 301 to establish, manage, and terminate various interactions between nodes or groups of nodes in a social network, including interactions involving the social device 301 itself.

The social device 301 further includes a social API 321 and browser-based interaction capabilities 327 to support, for example, relevant social applications and services 323 (which might comprise slave and master functions 318 and 319).

Security and access control 325 layers permit the social device 301 to interface with or establish secure SNET groups/circles and control access to internal and external SNET resources.

It is noted that numerous of the functional building blocks of the embodiment of the disclosure illustrated by FIG. 3 may be incorporated, in whole or part, in one or more (application specific) integrated circuit devices. For example, an integrated circuit device may include a member reporting module to provide member reporting functionality (including communication of device status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Figure 4:
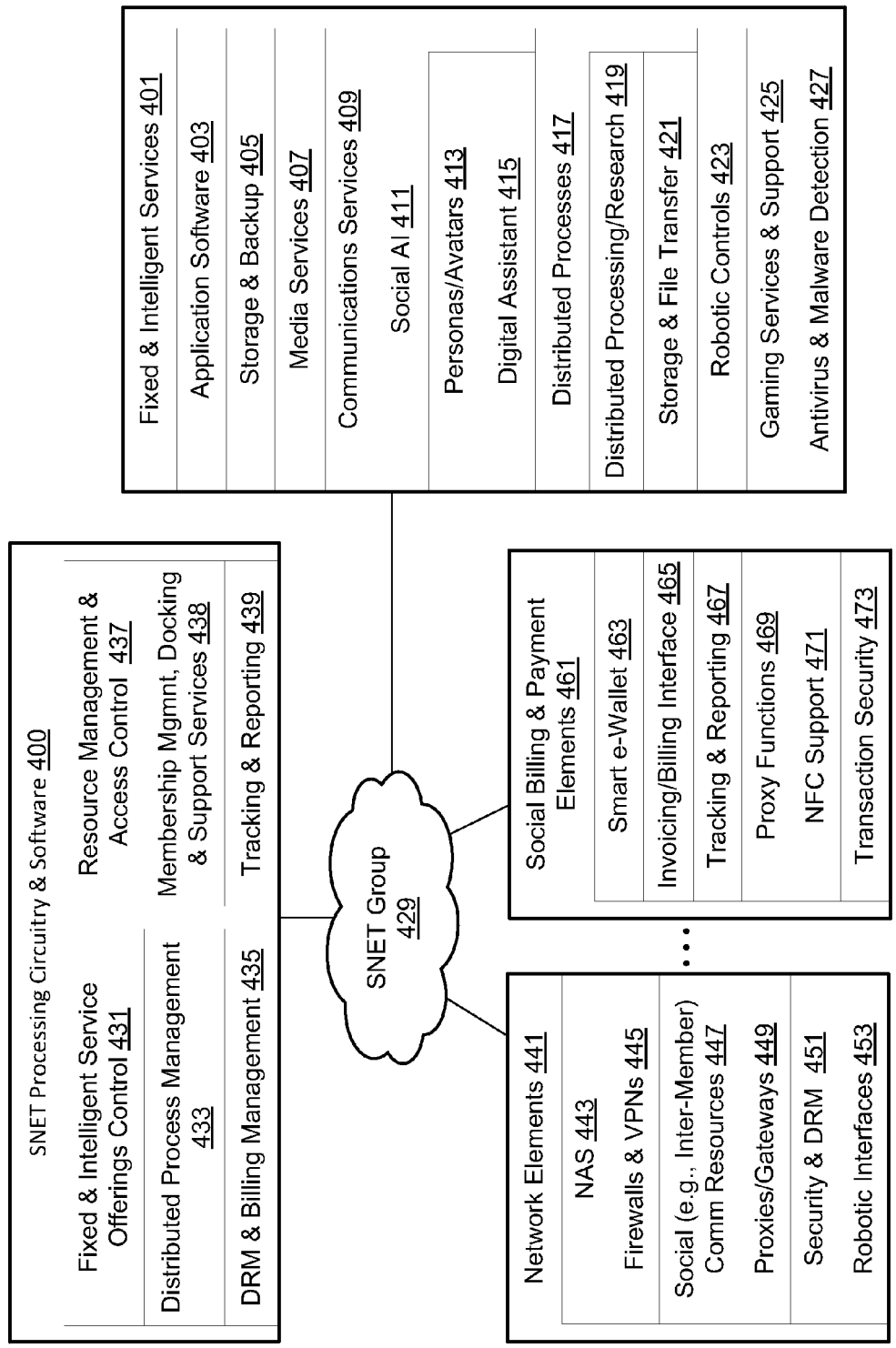
FIG. 4 is a functional block diagram of various embodiments of a social network group offering fixed and intelligent services and network elements in accordance with the disclosure.

FIG. 4 is a functional block diagram of various embodiments of a social network group 429 offering fixed and intelligent services and network elements in accordance with the disclosure. In the illustrated embodiments, standalone or distributed system circuitry such as SNET processing circuitry and software 400 manages formation, maintenance and operation of SNET group 429, as well as provision and management of affiliated service and resource offerings. It is noted that the "SNET processing circuitry" may comprise local and/or remote hardware, software, applications, or various combinations thereof, and be configurable to support various fixed and intelligent services/resources such as disclosed herein. Further, the SNET processing circuitry and software 400 may be included in one or more processing systems, SNET infrastructures, computers, (distributed) server devices, network nodes, cloud-based resources, social devices/services, or some combination thereof. Likewise, SNET group 429 may be comprised of one or more SNET groups/sub-groups.

SNET group 429 members, clients, users, and the like may include, for example, human members of a SNET or some other network, authorized nonmembers of a SNET, guests of a SNET, device members of a SNET or some other network, certain fixed and intelligent services/resources, some combination thereof, etc. In various embodiments, one or more services and capabilities associated with SNET group 429 may be accessed directly or through interaction with the SNET group 429 (e.g., via supporting system and/or a tiered SNET grouping hierarchy such as described below in conjunction with FIGS. 8-11). In addition, SNET group 429 may offer a series of functional members and/or resources that become available upon docking of a particular supporting device. Such functional members may be visible and available across a user(s) SNET account, to a particular SNET group/circle, to the functional member itself, to all SNET membership, etc.

In various of the illustrated embodiments, for example, a variety of services and resources are enabled in a SNET group 429, including fixed and intelligent services 401, computing and networking elements 441, and social billing and payment elements 461. The SNET processing circuitry and software 400 of the illustrated embodiments include one or more hardware/software functions for managing and facilitating such services and resources. These functions may include, for example, fixed and intelligent service offering control capabilities 431 (which may include configurable resource offering views, including visual offerings), distributed process management functions 433, DRM and billing management capabilities 435, resource management and access control capabilities 437, membership management, docking and support services 438, and tracking and reporting functions 439.

A SNET group 429 according to the illustrated embodiments may support and offer a wide variety of fixed and intelligent services 401. By way of example, and without limitation, application software 403 may be offered, including standalone applications (and associated device drivers as necessary) or dedicated applications that might support other functions and resources of a SNET group 429. Other service offerings may include storage and backup services 405, media-related services 407 (content storage and playback, transcoding functions, billing and DRM, etc.), and communications services 409 (both intra- and inter-SNET).

In further embodiments according to the disclosure, SNET group 429 membership and/or service offerings includes "social" artificial intelligence AI functionality 411. Such AI functionality may take the form, for example, of a dockable social robot. Potential robotic applications (which may utilize other SNET group 429 resources including robotic controls 423 and robotic interfaces 453) include factory robot monitoring, program exchange and human-to-robot and robot-to-robot-interaction via a SNET group (e.g., load sharing, support activity, data exchange, information, experience and training). Further such embodiments are described more fully below in conjunction FIG. 5.

AI functionality 411 in certain embodiments may include human-like services such as an artificial intelligence "digital assistant" 415 that is docked as a member of SNET group 429 and supports functions specific to the group and/or the underlying membership. Such AI members may have a fixed function or operate with an AI "persona" or other intelligence capabilities. Further, an artificial persona or avatar 413 that behaves as a friend or facilitates SNET group usage or training might be selected to participate as a member. Such concepts may be extended to add an individual's "personification" overlay (video, appearance, voice, etc.) on top of such persona/avatar and, in certain embodiments, may operate when the affiliated individual is offline. SNET group members may interact with one another through such avatars, such as character interactions in a multi-user virtual gaming environment.

According to another embodiment of the disclosure, members or affiliates of a SNET group 429 may donate or expose device computational capacity or other resources (such as storage) to support SNET managed or distributed processes 417 and distributed processing/research 419, such as distributed or peer-to-peer computing activities (for example, the search for extraterrestrial intelligence (SETI), virus decoding, etc.). In one embodiment, a SNET managed process may utilize accessible member resources for storage and file transfer 421, including distributed or RAID-like, real-time backup of one or more member's (distributed) data, media content, etc. Such distributed processes and associated data can be limited to one or more SNET groups (such as a household social group with auto-docking), and may be utilized for a wide variety of other purposes such as robotic control 423 of a group of social robots. Similarly, content or applications/software (e.g., imaging services) residing on a docked social device may be accessed by another social device.

In a further embodiment, an application docked as a SNET group 429 member may be configured automatically as a DMZ member with underlying functionality, such as a guest member having access to some SNET group resources but not others. For example, in an embodiment involving gaming activities, joinder of an SNET group by a gaming application and game member might result in service offerings to other SNET group members including, without limitation, configuration services based at least in part on underlying device limitations/capabilities. Similarly, docking of members may also trigger antivirus and malware detection services 427 within the SNET group 429, spanning all (or a subset) of implicated social devices, services, and software.

Network elements 441 may include, by way of example and without limitation, network attached storage (NAS) 443, firewalls and VPNs 445, social or allocable communication resources 447, networking/communication proxies and gateways 449, security and DRM hardware/firmware 451, robotic interfaces 453, databases, etc. Such resources may be allocated and utilized for specific purposes, or in support of one or more services and distributed processes such as those described herein. Various approaches may be utilized for managing and allocating network elements 441 as well as services and other resources. Exemplary methods for access to social network offerings, including through the use of general or member class-specific access rights, as well as dynamic reallocation of resources, is discussed in further detail in at least U.S. Utility patent application Ser. No. 13/408,986, entitled "Social Device Resource Management," filed Feb. 29, 2012, incorporated by reference herein in full for all purposes.

Various functions and resources of the social billing and payment elements 461 may include, by way of example and without limitation, a smart/digital electronic wallets 463, invoicing/billing interfaces 465, tracking and reporting functions 467, proxy functions 469, NFC/Bluetooth support 471, transaction security functions 473, etc. In one exemplary embodiment of the disclosure utilizing various of social billing and payment elements 461, payment authentication services are performed on a per-device (using a SIM card, bar code or the like) or per-SNET basis. For example, reading a bar code may trigger connection with a social network providing various options, including payment options, and/or enable another SNET member (e.g., a family member or processing node) to assume responsibility for payment of fines, fees, gaming credits, spending limits, etc. In this instance, an electronic invoice can be forwarded to the SNET group and/or responsible SNET member, and payment may be conducted through NFC-type functionality associated with an (social) electronic wallet, bank account, credit card, etc.

Payment may be subject to individual or circle-by-circle purchasing limits, and require one or more security/authentication steps. For example, a social member set-top box may incorporate smart/credit/debit card information and an associated billing interface, element or application/application interface to assist in performing billing transactions, including transactions involving confirmation via a separate communication pathway and/or social member (a smart phone, for example). Purchasing, payments, crediting, receipts, addition of credits and awards, etc., may be conducted and communicated within a particular circle(s) via a SNET member application or application interface. Security and security proxy functions may also be integrated into a social billing process according to the disclosure.

As will be appreciated, a SNET group 429 may be configurable to perform and utilize a wide variety of functions and services, including both member and non-member services, and selection of such services for use by a particular SNET group 429 may occur in a variety of ways. By way of example, a member device may offer a menu of available services to an affiliated human for use in selecting (local or remote) services for docking as a group member or otherwise activating and/or configuring services. Alternatively, services themselves, including member services or cloud-based services, might generate an invitation that can be accepted by one or more SNET group 429 members or affiliates. In other embodiments, a device that incorporates a social service (e.g., a social device purchased by a human member of an SNET group) can be activated and docked as a member of an SNET group, thereby making the social service available to other group members and affiliates. Alternatively, a service incorporated in a device—rather than the full device—may be docked with a SNET group.

Further, a social service in accordance with the disclosure may have multiple portions that run on different nodes of an SNET group or SNET support infrastructure. Using a media streaming service as an example, a portion of such service may operate on a docked social device (e.g., a device with media display capabilities), while other portions of the service, such as storage, billing or menu functions, may run on other SNET group nodes such as a NAS device 443 or social billing and payment element 461. The media streaming service may incorporate or operate in concert with other services, including external or third party services, such as a transcoding service that scales video for consumption by a variety of devices. Such video might be offered, for example, via a multi-port STB/gateway (such as that described in conjunction with FIG. 6) that maintains IP address information, linkages, device configurations, etc., and may deliver video via a direct or proxied communication pathway.

Figure 5:
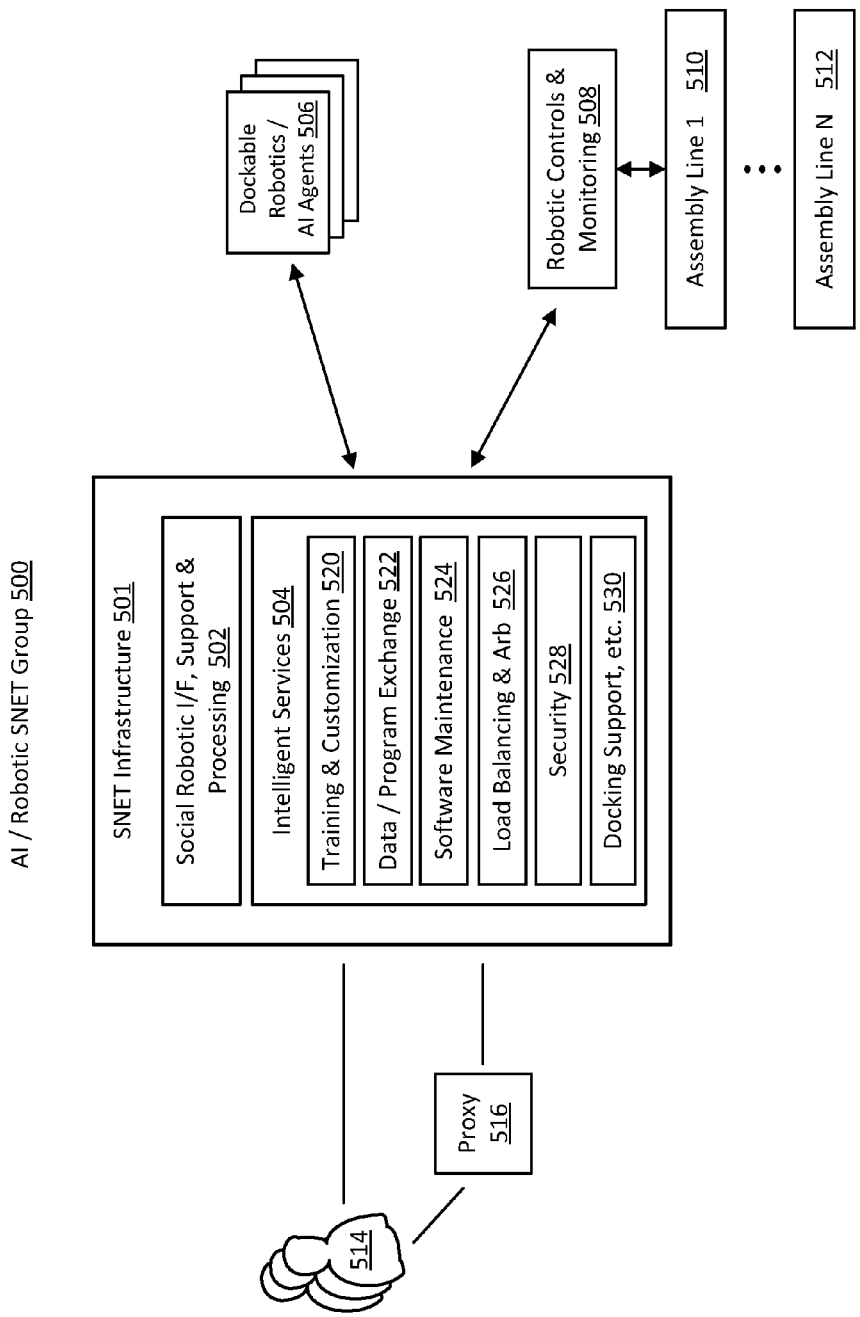
FIG. 5 is a functional block diagram of an artificial intelligence (AI)/robotic social network group in accordance with an embodiment of the disclosure.

FIG. 5 is a functional block diagram of an artificial intelligence (AI)/robotic SNET group 500 in accordance with the disclosure. Various embodiments of the SNET group 500 may include a wide variety of social/dockable robotics and AI agents 506, including, for example, discrete and/or distributed robots or robotic manufacturing equipment, robotic controls and monitoring services and machinery 508, components of one or more (physical or logical) assembly lines 510-512, proxies 516, medical equipment, etc.

In the illustrated embodiment, operation of the AI/robotic SNET group 500 is supported by SNET infrastructure 501, including social robotic interfaces, support and processing 502 to support, for example, human-to-robot and robot-to-robot-interaction, factory robot monitoring, etc. Further, the AI/robotic SNET group 500 incorporates or supports a variety of intelligent services 504, including training and customization services 520, data and program exchange services 522, software maintenance services 524, load balancing and arbitration services 526, security functionality 528, membership and docking support 530, etc.

In certain embodiments, such services may be used to establish, configure and maintain, for example, robotic and other configurable products, robotic manufacturing, assembly or other specialized processes. Select services also provide for: the cloning of software/hardware configurations and data exchange to facilitate setup and replication of robotic processes and activities; experience and training sharing (e.g., neural networking enhanced processes); resource allocation and load balancing; control, monitoring, support, and hardware/software maintenance operations; etc.

Various nodes and elements of the AI/robotic SNET group 500 may share functional control of robotic and AI activities and/or interact with a central control point (e.g., robotic controls and monitoring 508). For example, human members 514 or proxies 516 thereof may direct operation of SNET group functions and/or be the subject of such functions. Authorized access to services and resources of the SNET group 500 can be facilitated through unique biometric identifiers, passwords, token-based identification, trusted authorities or documents such as a driver's license or passport, and like authentication means.

Other entities may also interact with the AI/robotic SNET group 500 including, by way of example, vehicle manufacturers, automobile owners, hospitals and medical providers, repair shops, insurance companies, governmental inspection and compliance agencies, emergency services/devices, and other third parties that might have an interest in communicating with or participating in the AI/robotic SNET group 500. In another embodiment, an AI/robotic SNET group 500 may itself join another SNET group, or form one or more SNET sub-groups. In various embodiments, AI and robotic elements of the SNET group 500 may operate as social devices, social "parent" devices and social "child" devices as described below in conjunction with FIGS. 6 and 7, including functioning as a child/parent for one or more human members 514.

Figure 6:
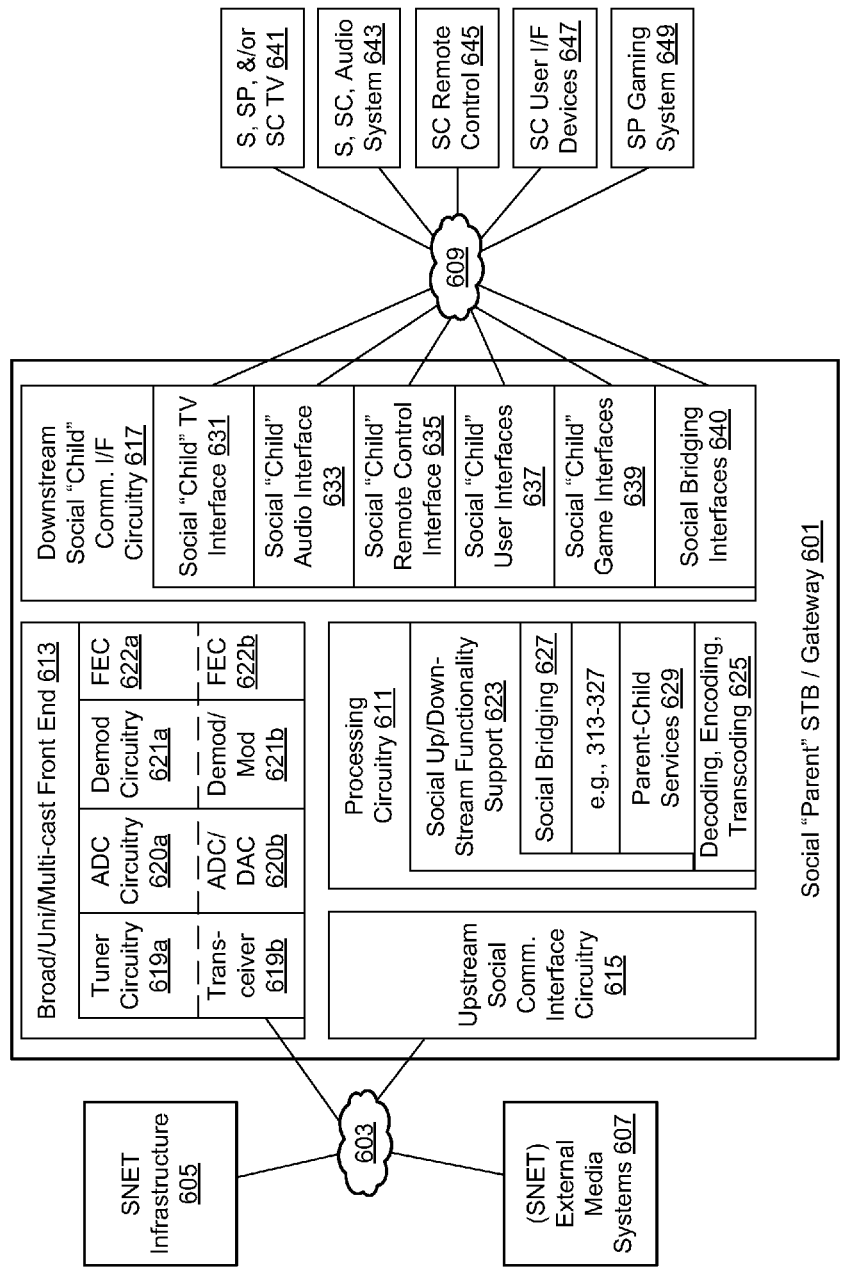
FIG. 6 is a schematic block diagram of an embodiment of a social set-top box (STB)/gateway in accordance with the disclosure.

FIG. 6 is a schematic block diagram of an embodiment of a social set-top box (STB)/gateway in accordance with the disclosure. The STB/gateway 601 provides a number of functions, including conversion of signals from upstream sources into content that can be consumed by downstream social devices and services. The STB/gateway 601 may further operate as a gateway that supports unidirectional or bidirectional communications and bridging between upstream and downstream devices and services.

Figure 7:
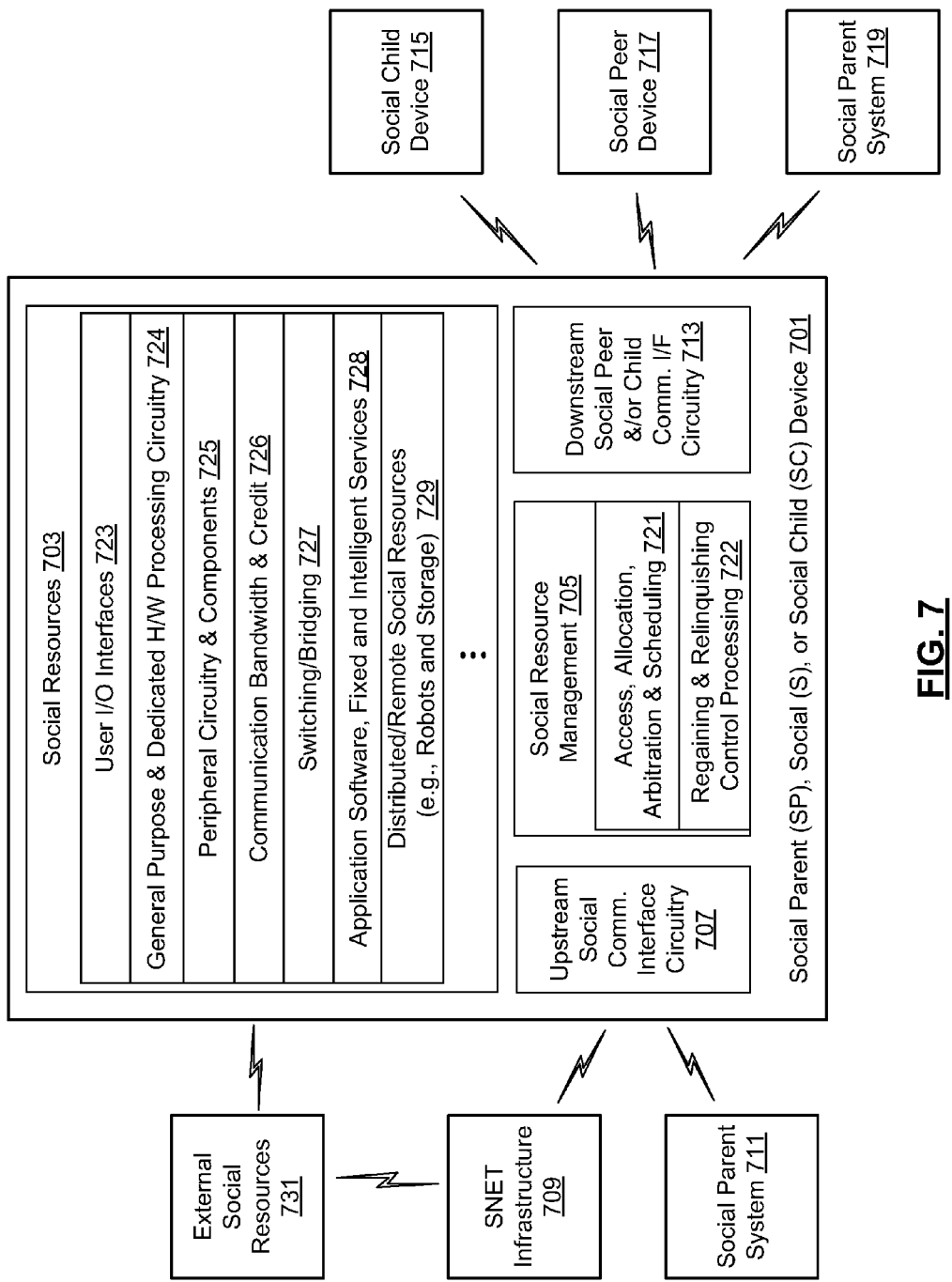
FIG. 7 is a schematic block diagram of a social device operable to support various interactions between other social devices and social services and systems in accordance with an embodiment of the disclosure.

As described more fully in conjunction with FIG. 7, the illustrated social devices (or, alternatively, services) may operate in a social device "hierarchy" comprising social devices, social "parent" (SP) devices and social "child" (SC) devices. Briefly, SP devices may enable associated SC devices to interact and/or connect with a social network, either directly or indirectly. Social capabilities of a SC device can be provided via a SP device.

Further, certain social devices according to various embodiments and applications of the disclosure, such as the STB/gateway 601 and downstream devices 641-649, may concurrently or selectively function as a social device, SP device, and/or SC device. Associations between SP and SC devices may be established in a selective, automatic or automated manner. For example, docking of the STB/gateway 601 with a SNET infrastructure 605 may result in automatic docking of user(s) home devices.

The STB/gateway 601 of the illustrated embodiment interacts with a SNET infrastructure 605 and (SNET) external media systems 607 via one or more wired and wireless networks/links 603. The wired and wireless networks/links 603 (and 609) may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links 603 may comprise a multi-hop network utilizing a spanning tree protocol, direct wireless connections, peer-to-peer links, etc.

The (SNET) external media systems 607 may comprise, for example, one or more of cable, satellite and/or terrestrial televisions systems. Various headend equipment and services can be utilized by these systems, such as a cable headend that receives television signals for further processing and distribution, and may offer various other services such as internet connectivity.

While the illustrated STB/gateway 601 functions as a social parent device, in alternate embodiments it could have a peer-to-peer or parent relationship with the SNET infrastructure 605 (and SNET members associated therewith) or (SNET) external media systems 607. For example, a cable headend itself might include social capabilities allowing it to participate as a node in a social network.

The STB/gateway 601 of the illustrated embodiment includes a broadcast/unicast/multicast front end 613 that operates to receive compressed digital video, digital audio and other data signals, from either the (SNET) external media systems 607 or SNET infrastructure 605, for further processing and distribution. The front end 613 comprises tuner circuitry 619a operable to isolate particular channels. Signals from the tuner circuitry 619a are then provided to analog-to-digital (ADC) circuitry 620a and demodulation circuitry 621a for conversion into binary format/stream. Once in binary format, forward error correction (FEC) circuitry 622a checks the integrity of the received binary stream. Audio, video, and data extracted from the binary stream may then be decoded (e.g., by decoding 625) into formats suitable for consumption by downstream social devices. It is noted that demodulation circuitry 621a may support one or more modulation techniques, such as Quadrature Phase Shift Keying (QPSK), Quadrature Amplitude Modulation (QAM), Coded Orthogonal Frequency-Division Multiplexing (COFDM), etc.

The front end 613 may be integrated into one or more semiconductor devices that may further support, for example, interactive digital television, networked DVR functionality, IP video over DOCSIS applications, and 3D graphics support. In addition, multiple tuner circuitry 619a (including in-band and out of band tuners), ADC circuitry 620a and demodulation circuitry 621a may be provided for different television standards (such as PAL, NTSC, ATSC, SECAM, DVB-C, DVB-T(2), DVB-H, ISDB, T-DMB, Open Cable) and modulation schemes. Further, in certain embodiments, sharing of channels and associated program information provided by the front end 613 may be considered a social function.

In one alternative embodiment of the disclosure, functionality of the STB/gateway 601 functionality is performed by a smartphone or mobile computing device. In this embodiment, the "front end" 613 comprises one or more wireless interfaces (including PHY and baseband functions), such as a cellular (3G, 4G, IMT-Advanced, etc.) or wide area network (WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 619b, analog-to digital (ADC) and digital-to-analog (DAC) circuitry, demodulation and modulation circuitry 621b and FEC (such as turbo codes or LDPC codes) circuitry 622b. Encoding, decoding and transcoding 625 functions may be provided by processing circuitry 611.

The STB/gateway 601 also includes upstream social communication interface circuitry 615 for communicating with SNET infrastructure 605 and/or (SNET) external media system 607. Through the social communication interface circuitry 615, the STB/gateway 601 may communicate directly with upstream resources, or offer (bidirectional) bridged communications between such resources and devices (e.g., social devices 641-649) coupled to the STB/gateway 601.

In the embodiment of FIG. 6, STB/gateway 601 interacts with a variety of social devices 641-649 and upstream resources via upstream social communication interface circuitry 615 and downstream social "child" communication interface circuitry 617 coupled to one or more wired and wireless communication networks 603/609. For example, a television interface module 631 communicates with a (digital) television 641 or other media display device to relay television programming and enable available interactive services. Similarly, an audio interface 633 provides audio programming or audio library access to an audio system 643.

The communication interface circuitry 617 further comprises a remote control interface 635 for receiving control signals from a remote control 645. In addition to traditional remote control operations, the remote control 645 may further offer voice and/or gesture control signals that are relayed or mapped to relevant consumer devices. User interfaces 637 are also provided for communications with one or more user interface devices 647. Gaming interfaces 639 function to provide interactive communications with a gaming system 649. Such communications may involve, for example, online, multiplayer gaming between members a social network and/or external players in a gaming platform.

Various communications between downstream devices 641-649 may be bridged, without substantive modification, to various nodes in a social network via social bridging interfaces 640. Such bridging may operate independently of the set top functionality of the STB/gateway 601. For example, social child devices may communicate directly with a SNET infrastructure 605 to receive "social" channel broadcasts from a social group or IPTV services.

The STB/gateway 601 of the illustrated embodiment includes processing circuitry 611 (which may be comprised of hardware, software, or combinations thereof), social upstream/downstream functionality support 623, and decoding functionality 625 to support social interactions such as those described above. Social upstream/downstream functionality support 623 in this embodiment includes various functions such as social bridging 627, parent-child services 629, and other functionality such as functions 313-327 of FIG. 3. It is noted that the processing circuitry 611 may be made available in whole or part as a SNET resource.

Referring now to FIG. 7, a schematic block diagram is shown for a social device 701 operable to support various interactions between other social devices and social services and systems in accordance with an embodiment of the disclosure. The social device 701 is configured with a variety of functions that enable it to operate in a social device hierarchy comprising social (S) devices, social "parent" (SP) devices and social "child" (SC) devices. For example, a social parent device may enable a docked social child device to access resources of the parent device and/or connect to and interact with (directly or indirectly) with a social network. The social child device may be configured with inherent social capabilities, or gain access to such capabilities from or through an associated parent device. Further, a human SNET member might have associated social child devices, or be served by a social parent device via a user I/O interface (723).

A social device 701 according to various embodiments and applications of the disclosure may also concurrently or selectively function as a social device, SP device, SC device, or even a "grandparent" device that supports (e.g., in a multi-hop environment) a parent device in a SNET group. Dynamic and static hierarchical associations between SP and SC devices may be established in a selective, automatic or automated manner. Further, a social device 701 may take many forms including, without limitation, a smartphone, personal computer, server, tablet device, access point, gateway, network switch/hub, bridging device, set top box, or other device enabled with social capabilities.

In the illustrated embodiment, the social device 701 is communicatively coupled to a SNET infrastructure 709 and/or social parent system 711 via upstream social communication interface circuitry 707. Likewise, downstream social peer and/or child communication interface circuitry 713 enables coupling with a social child device 715, social peer device 717 and/or social parent system (device) 719. Social resources of both upstream and downstream devices may be accessible to one another via the social device 701.

The social device 701 of this embodiment includes social resources 703 that, along with external SNET resources, are managed by a social resource management module 705 and accessible to at least one other SNET group member. Specific social resources 703 may include user I/O interfaces 723, general purpose and dedicated hardware processing circuitry 724, peripheral circuitry and components 725 (which may or may not have social capabilities), communication bandwidth and credit determination functionality 726 (e.g., for use by payment processing services), switching/bridging functions 727, application software and fixed/intelligent services 728, remote social resources 729 of the SNET group, external social resources 731 controlled by the social device 701, etc. The external social resources 731 may comprise, for example, an external data/digital library, or content from one or more of cable, satellite and/or terrestrial televisions systems.

Among other functions, the social resource management module 705 comprises access, allocation, arbitration and scheduling functionality 721, as well as the functionality for establishing, regaining and relinquishing control processing operations 722, including operations involving access to social resources 703. It is noted that counterpart social resource management functionality may be present in the SNET infrastructure 709 and/or other SNET nodes.

In one exemplary embodiment wherein the social device 701 comprises a switching bridge, bandwidth capacity may be dynamically allocated by access, allocation, arbitration, and scheduling functionality 721. Access to bandwidth capacity and other resources of the social device 701 might be available only upon request, per access views, or per allocation and arbitration functions, and selectively terminated when excessive bandwidth/resources are consumed or requested.

Figure 8:
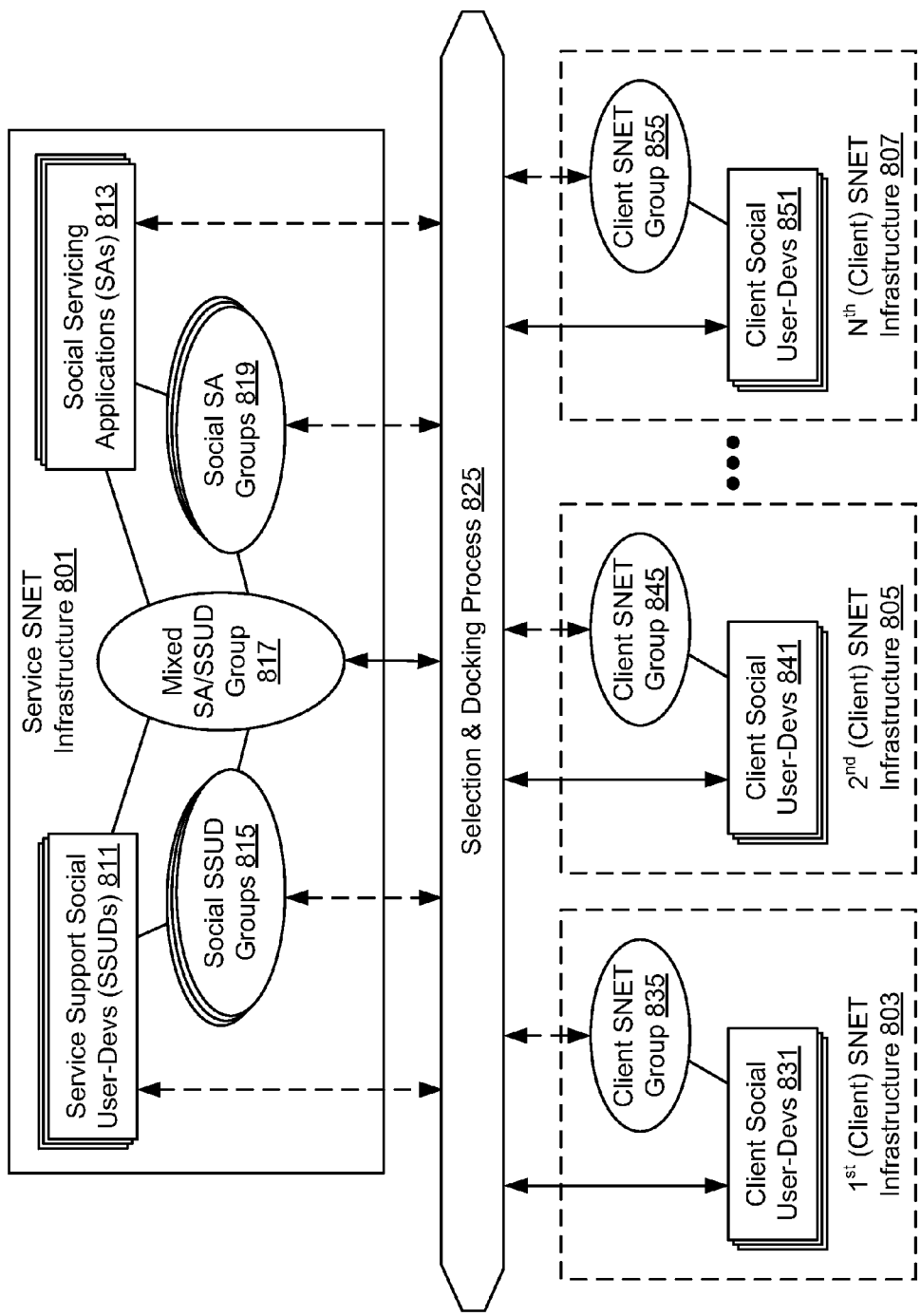
FIG. 8 illustrates a schematic block diagram of a social networking grouping hierarchy according to various embodiments of the disclosure.

FIG. 8 illustrates a schematic block diagram of a social networking grouping hierarchy 800 according to various embodiments of the disclosure. In some embodiments, a SNET grouping hierarchy 800 includes one or more tiers of SNET infrastructure, encompassed at least in part by a SNET, that can be docked to (hereinafter referred to interchangeably as "associated with", "joined", and the like) other SNET infrastructure, SNET groups, and social devices. For example, in the illustrated embodiment, one tier of SNET grouping hierarchy 800 can include a service SNET infrastructure 801, and another tier of SNET grouping hierarchy 800 can include one or more client SNET infrastructures 803, 805, and 807. In some embodiments, various tiers can be docked such that a "higher" tier can be docked to "lower" tiers to provide access by "lower" tiers to various capabilities provided by the "higher" tier.

In some embodiments, one or more infrastructures are managed by one or more processing systems, computers, server devices, network nodes, social devices/services, or some combination thereof. For example, in the illustrated embodiment, some or all of the service SNET infrastructure 801, one or more client SNET infrastructures 803, 805, and 807, or some combination thereof may be managed by one or more social service support devices 811, one or more client social devices 831, 841, and 851, or some combination thereof. Processing systems can include, without limitation, one or more instances of processing circuitry distributed across one or more server devices or network nodes.

For example, in the illustrated embodiment, SNET grouping hierarchy 800 includes a service SNET infrastructure 801 in a first tier, and multiple client SNET infrastructures 803, 805, and 807 in a second tier. Infrastructures can include, without limitation, one or more SNET groups, one or more services, applications, resources, devices, and the like associated with one or more entities, which can include, without limitation, clients, members of a SNET, nonmembers of a SNET, guests of a SNET, etc. For example, service SNET infrastructure 801 may include user devices 811, applications 813, and SNET groups 815, 817, and 819 associated with one or more services.

Similarly, a client SNET infrastructure 803 can include one or more client SNET groups 835 and one or more social devices 831 associated with one or more particular clients (hereinafter referred to interchangeably as users, members, visitors, guests, and the like). For example, a first client-side infrastructure 803 can include one or more SNET groups 835 associated with a SNET member, along with one or more social devices 831 associated with the SNET member. As shown in the illustrated embodiment, the social devices 831 in a client infrastructure 803 can be docked or otherwise affiliated with SNET groups associated with the client. At least one process of docking is discussed in further detail in at least U.S. Utility patent application Ser. No. 13/408,986, entitled "Social Device Resource Management," filed Feb. 29, 2012, incorporated by reference herein in full for all purposes. In some embodiments, a device or SNET group docked to another SNET group becomes a member of the SNET group to which it is docked. By docking a client social device 831 to a client SNET group 835, a user associated with a client SNET group 835 may interact with the SNET group 835 by interacting with a social device 831 docked to the SNET group 835. Members, clients, users, and the like may include, without limitation, human members of a SNET or some other network, device members of a SNET or some other network, certain fixed and intelligent services, some combination thereof, etc.

In some embodiments, one or more capabilities which might include, for example, various services, applications, or SNET groups, are mixed, combined, and/or merged via a docking process, into one or more SNET groups that can provide access to a desired selection of capabilities through interaction with the one or more SNET groups. For example, service SNET infrastructure 801 illustrates capabilities that can be provided by various service support social user devices 811 and/or various social servicing applications 813. In some embodiments, access to various service support social user devices 811, either directly or through interaction with a SNET group 815 to which the service support social user devices 811 are docked, and access to various social servicing applications 813, either directly or through interaction with a SNET group 819 docked to the social servicing applications 813, can be provided to SNET members.

One or more of the capabilities provided by the devices 811, applications 813, and SNET groups 815 and 819 may be combined into a single SNET group that can provide access to one or more capabilities provided by devices, services, applications, SNET groups, or some combination thereof. For example, a user of a client SNET infrastructure 803 can, by docking a social device 831, via a docking process 825 (which may be supported by local or distributed system circuitry), to a single SNET group 817 that itself combines SNET groups 815 and 819, gain access to the capabilities provided by both SNET groups 815 and 819 by docking with SNET group 817.

In some embodiments, access to capabilities provided by one or more SNET groups/infrastructures can be accomplished by docking one SNET group to another SNET group. For example, a client SNET group 835 can be docked, via a docking process 825, to SNET group 817, thereby enabling a user of the client-side infrastructure 803 to access the capabilities provided by SNET group 817 through the client SNET group 835. In particular, where one or more social devices 831 are docked to the client SNET group 835, a user can access the capabilities provided by SNET group 817 via one or more of the social devices 831 that are docked with the client SNET group 835. A docking process 825 can include joining client SNET group 835 as a member of SNET group 817, docking (also referred to herein as "associating") client SNET group 835 to SNET group 817 via one of various processes described herein and in at least U.S. Utility patent application Ser. No. 13/342,301, entitled "Social Network Device Memberships and Applications," filed Jan. 3, 2012, and U.S. Utility patent application Ser. No. 13/408,986, entitled "Social Device Resource Management," incorporated by reference herein in full for all purposes.

As an illustration of the above embodiment, a user entering premises including, without limitation, a store, restaurant, hotel, business, public area, and the like may desire to access capabilities including, without limitation, services, applications, information, devices, some combination thereof, and the like provided by a SNET group associated with the premises. Rather than individually dock each of the user's devices with the SNET group, the user can simply dock a personal SNET group, to which the user's devices are docked, with the SNET group associated with the premises, thereby granting the user access to the premises' capabilities through some or all of the devices that the user has docked with his personal SNET group. As a further example, a hotel may provide various capabilities including, without limitation, access to a call routing phone service, control of a particular television device, access to a database, payment and billing services, etc. through a SNET group. Rather than individually dock his personal devices to the hotel's SNET group to utilize the capabilities provided, including, for example, docking a smartphone device to the hotel SNET group to utilize the call routing phone service, or docking a computer device to the hotel SNET group to control the particular television device, the guest can simply dock his personal SNET group to the hotel's SNET group and then access the capabilities provided through the hotel's SNET group through a device docked with his personal SNET group.

In some embodiments, docking SNET groups such that a user, member, client, or the like can access capabilities provided by various services, devices, and SNET groups associated with various SNET infrastructures enhances security. For example, where a user associated with a first client SNET infrastructure 803 can only access capabilities provided by service SNET infrastructure 801 by docking with SNET group 817, various levels of security can be utilized by one or more processing systems/devices associated with the service SNET infrastructure 801, client SNET infrastructure 803, etc. to ensure secure access to the capabilities.

In addition, in some embodiments, accessing capabilities provided by a SNET infrastructure by docking two or more SNET groups provides additional levels of security. For example, where access to capabilities provided by service SNET infrastructure 801 entails docking a client SNET group 835, 845, 855, or the like to SNET group 817, a more secure connection, with various levels of security, can be employed, and access to the capabilities can be easily granted, altered, restricted, or terminated via management of a single dock or association between a client SNET group and SNET group 817. A processing system/device associated with the service SNET infrastructure 801 or a client SNET infrastructure 803 may manage the association based upon inputs received from a user, a third-party entity, some internal logic, elapse of a period of time, a change in geographic location of a client social device 831 associated with the client SNET infrastructure 803, or some other trigger event.

In some embodiments, the selection and docking process 825 can be automated, and/or automatic. For example, a docking process may be automatic by being triggered based upon a location of a user of an infrastructure, including, without limitation, a geographic proximity of one or more of a user, a social device 831 associated with a user, or a social device 831 docked with a particular client SNET group 835. In some embodiments, a user can provide one or more association rules that can provide conditions under which one or more particular client SNET groups 835 can be docked to other SNET groups. Conditions may include, for example, geographic proximity of one or more social devices 831 docked to the particular client social 835 to a geographic location associated with a SNET group 817, authorization by a user associated with the infrastructure 803, SNET group 835, or social device 831 to dock the client SNET group 835 with SNET group 817. Association rules can be communicated to a social device 831 docked with a particular SNET group 835 or a processing system that manages docking of various SNET groups. A processing system, a social device 831, or some combination thereof can monitor a client SNET group 835, social device 831 docked to the client SNET group 835, one or more attributes of another one or more SNET groups 817 in relation to one or more attributes of one or more client SNET groups 835, docked social devices 831, or the like in relation to one or more association rules in order to determine whether to dock one or more SNET groups and/or social devices/services together. Association rules can be altered by a user or a processing system on the fly to create new rules, delete rules, alter rules, etc. For example, a user associated with a client SNET group 835, who may have previously communicated to a processing system an association rule that prohibits docking the client SNET group 835 to a SNET group 817 beyond a threshold geographic proximity to a social device 831, can communicate, on the fly, an alteration of the association rule that can include, for example, altering the threshold geographic proximity, authorizing a docking of the client SNET group 835 to a particular SNET group 817 on a case-by-case basis, ordering an undocking of a client SNET group 835 from another SNET group, etc.

In some embodiments, various tiers of a SNET grouping hierarchy 800 are subject to various levels of access to information and/or services. For example, in the illustrated embodiment, a user of the "higher-tier" service SNET infrastructure 801 may be able to view each client SNET group 835, 845, and 855 associated with a "lower-tier" client SNET infrastructure 803, 805, and 807 that is docked to a SNET group 817 associated with the social service infrastructure 801. A user of the service SNET infrastructure 801 may also be able to view the various social devices 831, 841, and 851 docked to the various client SNET groups 835, 845, and 855. In another example, one or more users of a "lower-tier" infrastructure including, without limitation, client SNET infrastructure 803, 805, and 807 may be able to view some or all of the capabilities provided through a SNET group associated with a "higher-tier" infrastructure to which a SNET group associated with the "lower-tier" infrastructure is docked, but cannot view some or all of the "higher-tier" infrastructure, including, without limitation, various SNET groups 815 and 819 from which capabilities provided by SNET group 817 are originally provided. Additionally, a user of a "lower-tier" infrastructure accessing a SNET group 817 associated with a "higher-tier" service SNET infrastructure 801 may be unable to view some or all of the other similarly "lower-tier" client SNET infrastructures 805 and 807 that are also docked with the same SNET group 817.

In some embodiments, the selection and docking process 825 can be controlled or managed by one or more various social devices or processing systems. For example, a processing system of a SNET infrastructure, which can include one or more instances of processing circuitry distributed across one or more server devices and/or network nodes may control the docking and undocking of one SNET group to another, based upon a user's interaction with the SNET, one or more association rules, one or more inputs, some internal logic, etc. As another example, a social device may control the docking and undocking of one or more SNET groups based upon a user's interaction with the SNET, one or more association rules, one or more inputs, some internal logic, etc. In some embodiments, a processing system or social device authorized to manage a "higher tier" infrastructure can manage one or more attributes of access by one or more "lower-tier" infrastructures docked to the "higher-tier" infrastructure. For example, a processing system authorized to control a "higher-tier" social service infrastructure 801 may alter access to certain capabilities, restrict access to certain capabilities, and/or terminate access via undocking of SNET groups and devices based upon input or other logic operation. The processing system may determine that a trigger event (e.g., all social devices 831 docked with a client SNET group 835 docked to SNET group 817 have exceeded a predetermined threshold of proximity distance from a geographic location associated with SNET group 817) has occurred and, based upon the determination, undock the client SNET group 835 from SNET group 817, partially or fully restrict access by client SNET group 835 to certain capabilities provided by SNET group 817, etc.

Figure 9:
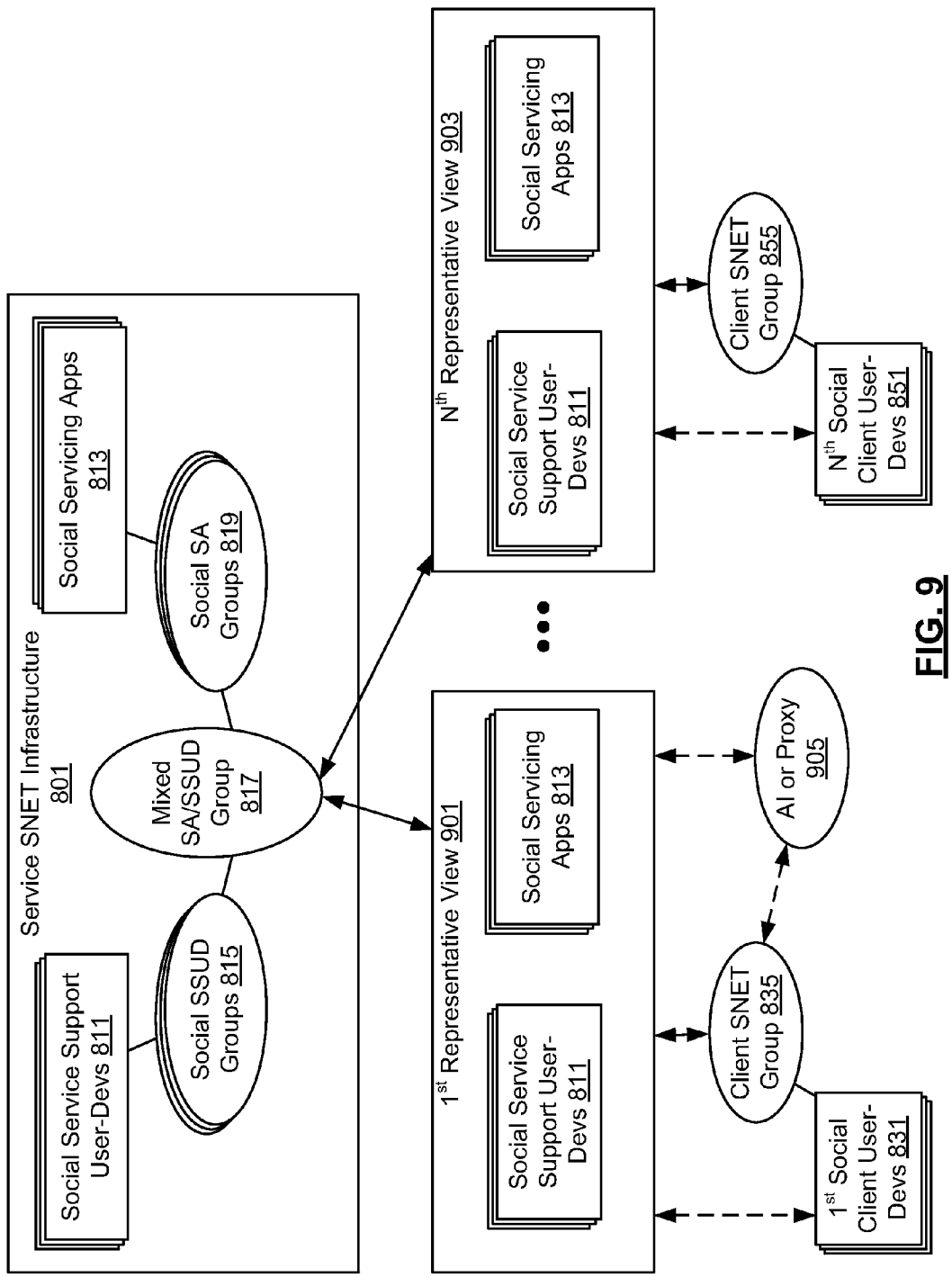
FIG. 9 illustrates a schematic block diagram of representative resource views according to various embodiments of the disclosure.

Referring now to FIG. 9, representative resource views according to various embodiments of the disclosure are illustrated. In some embodiments, a user, SNET member, or SNET nonmember associated with a first infrastructure that is docked with a second infrastructure (via one or more docked SNET groups or social devices/services) can access capabilities provided by the second infrastructure by interacting with a representative view. The representative view can be part of data provided by a processing system, some part of the second infrastructure, some part of the first infrastructure, a social device associated with the first infrastructure, a second device associated with the user, some combination thereof, or the like. For example, where a client SNET group 835 of the first social client-side infrastructure 803 is docked with a SNET group 817 of the social service infrastructure 801 that provides device access capabilities 811 and 813 (provided by SNET groups 815 and 819), a user may access capabilities provided by SNET group 817 via interaction with a representative view 901. Where a client SNET group 835 is docked with one or more client social devices 831, a user may interact with some part of one or more social devices 831 to access capabilities provided by SNET group 817 via the client SNET group 835, directly via the social devices 831, etc.

In some embodiments, a representative view can provide a simplified representation of the services and other capabilities that can be accessed via a docking of one or more SNET groups or devices. For example, while SNET group 817 provides capabilities 811 and 813 by merging the SNET groups 815 and 819, a representative view 901 provided to a member accessing SNET group 817 (e.g., via a docked client SNET group 835 or AI agent/proxy node 905) may display only the capabilities provided by SNET group 817 with little or no indication of the true complexity of the groups 815 and 819 that are combined to enable SNET group 817 to provide capabilities 811 and 813. A member accessing the capabilities 811 and 813 via a representative view 901 may access the capabilities 811 and 813 by interacting with representations of those capabilities included in representative view 901. Interaction with the representative view 901 can, in some embodiments, proceed via interaction with some part of a docked social device 831 including, without limitation, a user interface, service or a part of a docked client SNET group 835.

In some embodiments, one or more third-party SNET groups associated with separate members, infrastructures, and the like are docked with a first SNET group to enable members of the third-party SNET group to access some or all of information and resources/services associated with the first SNET group. For example, in the illustrated embodiment, an AI agent/proxy 905 can be docked to client SNET group 835, thereby enabling access to some or all of the information provided to members of client SNET group 835, capabilities provided by SNET group 817 that is docked to client SNET group 835, etc.

As an example of the above, a traveler may desire to dock a client SNET group or agent/proxy 905 associated with his company to a personal client SNET group 835 associated with his business travels. By docking in this manner, the traveler may enable members of the company's agent/proxy 905 to view the traveler's whereabouts provided to members of his personal client SNET group 835, access at least some of the capabilities provided to the traveler by docking with other SNET groups via the same or a similar representative view 901 (e.g., access and manage his travel reservations, provide relevant travel and business update information to the traveler on the fly, etc.), etc. Such dockings can be managed by the traveler's social device 831, by the social service infrastructure 801 based upon input provided by the traveler, by one or more other devices or services, or some combination thereof. For example, the traveler may authorize only limited access by docked third-party AI agents/proxies 905 to information associated with his personal client SNET group 835, to services and other capabilities provided by a docked SNET group 817. Further, the traveler may authorize access restrictions, undocking, and like operations based upon on-the-fly input or one or more trigger events. Trigger events can include, without limitation, a change in geographic location associated with one or more social devices 831 associated with the traveler, a change in authorization information provided by an entity, etc.

In some embodiments, distinct representative views can be provided where separate SNET groups and/or SNET services and devices associated with a "lower-tiered" infrastructure are docked to a "higher-tiered" infrastructure in a SNET grouping hierarchy. In the illustrated embodiment, for example, client SNET group 835 and client SNET group 855, which are associated with a first social client-side infrastructure 803 and an Nth social client-side infrastructure 805, respectively, are each docked to SNET group 817 associated with social service infrastructure 801. In the illustrated embodiment, a first representative view 901 is provided to a member accessing the capabilities of SNET group 817 through the client SNET group 835, a docked social device 831, and/or AI agent/proxy 905, and an nth representative view 903 is provided to a member accessing the capabilities of SNET group 817 through client SNET group 855, a docked social device 851, or some combination thereof.

In some embodiments, representative views provided to separate docked SNET groups are distinct and separate. For example, in an embodiment where SNET group 817 provides capabilities associated with a hotel experience, including, without limitation, remote control of a television device or payment services, and wherein docked client SNET groups 835 and 855 are associated with separate hotel guests, the capabilities provided via one or more separate representative views can be distinct such that the hotel guest can access capabilities customized to the guest. Where the guest is not a SNET member, the guest can be invited to create a temporary/guest SNET group or an ad hoc SNET group, and then dock the created SNET group to another SNET group to access capabilities provided by the other SNET group.

Figure 10:
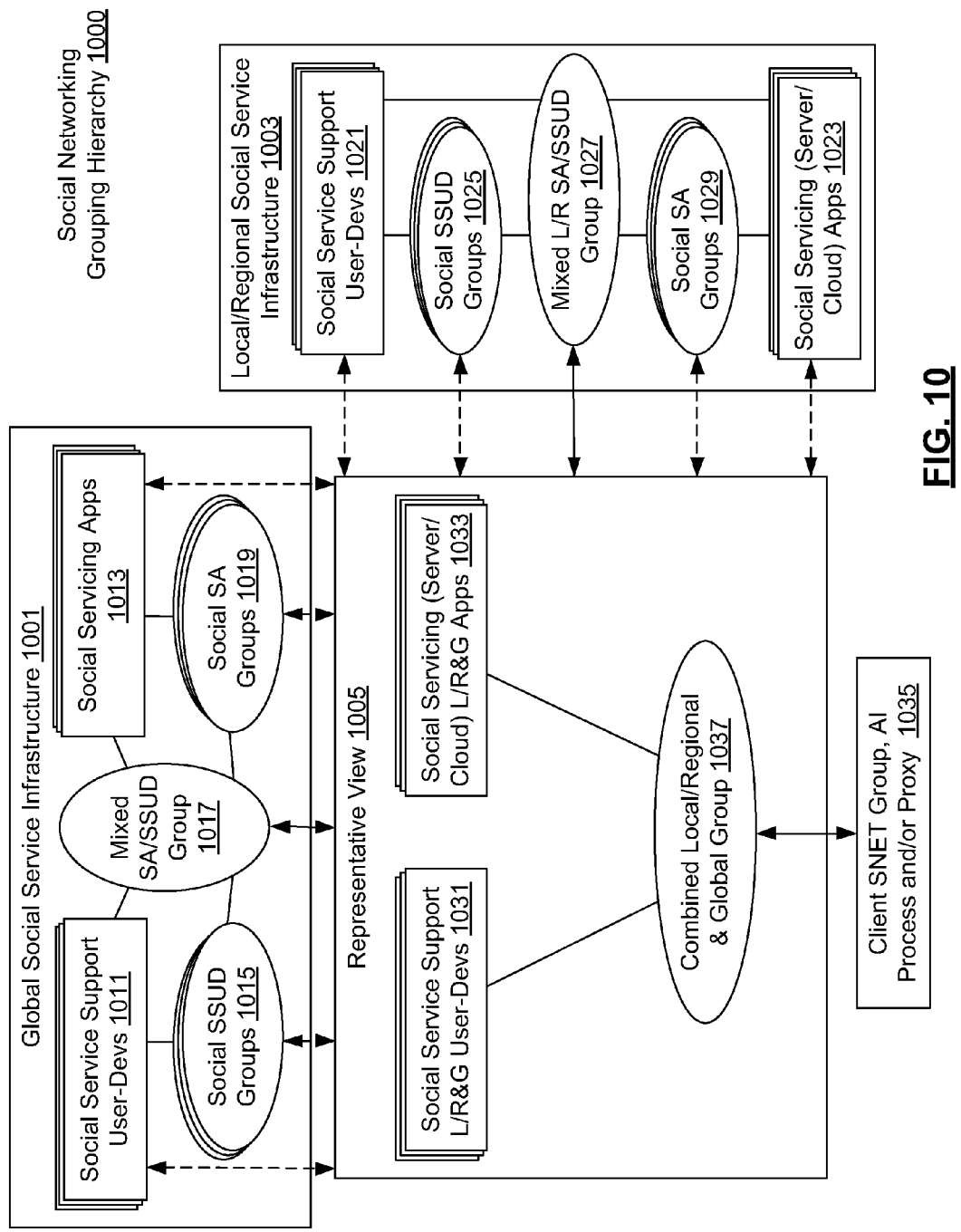
FIG. 10 illustrates a schematic block diagram of social networking groupings and representative resource views according to various embodiments of the disclosure.

Referring now to FIG. 10, a social networking grouping hierarchy 1000 and representative resource views 1005 according to various embodiments of the disclosure are illustrated. The SNET grouping hierarchy 1000 can enable a client SNET group, AI agent/service and/or proxy 1035 ("client SNET group 1035") to dock to a SNET group that provides capabilities from various infrastructures. In the illustrated embodiment, two infrastructures 1001 and 1003 are combined, docked, or otherwise associated to provide capabilities from both through a single combined SNET group 1037. The global social service infrastructure 1001 includes capabilities provided by social service support user devices 1011, social servicing applications 1013, and various SNET groups 1015, 1019, and 1017 that provide some combination of the services and other capabilities provided by the infrastructure 1001.

In addition, the local/regional social service infrastructure 1003 also includes capabilities provided by social service support user devices 1021, social servicing applications 1023, and various SNET groups 1025, 1029, and 1027 that provide some combination of the services and other capabilities provided by the infrastructure 1003. The combined local/regional and global SNET group 1037 provides a combination of the capabilities provided by the social service support user devices 1011 and 1021 and the social servicing applications 1013 and 1023 provided by both infrastructures 1001 and 1003. Where client SNET group 1035 can be docked with SNET group 1037, a member of client SNET group 1035 will be able to access the capabilities provided by both infrastructures by docking a single client SNET group with a single SNET group 1037.

In some embodiments, a representative view 1005 provided to a member of client SNET group 1035 accessing the capabilities provided by SNET group 1037 includes only the combined capabilities provided by both infrastructures 1001 and 1003 independently of some or all indications of the infrastructure from which such capabilities are originally provided. In the illustrated embodiment, for example, the capabilities provided by the social service support user devices 1031 and 1021 from both infrastructures 1001 and 1003 are presented in the representative view 1005 as a combined set of social service support user devices 1031; likewise, the social servicing applications 1013 and 1023 from both infrastructures 1001 and 1003 are presented in the representative view 1005 as a combined set of social servicing applications 1033. In addition, all of the SNET groups 1015, 1017, 1019, 1025, 1027, and 1029 in the infrastructures that are partially or fully combined into SNET group 1037 may be partially or fully transparent to a member accessing a representative view 1005 of the capabilities provided by SNET group 1037. In some embodiments, a member accessing representative view 1005 can restore the full complexity of the combination of infrastructures 1001 and 1003 in representative view 1005, such that the member can view the various SNET groups and capabilities specific to various infrastructures and provided capabilities.

As an example of the illustrated embodiment, a hotel chain may provide a global SNET infrastructure 1001 that provides capabilities common to all hotels in the franchise, such as a global media database, corporate contact information, information databases, payment services and the like. In addition, a certain local hotel may desire to have a local SNET infrastructure 1003 that provides access to local entertainment, dining, news information, device access specific to the local hotel, etc. The hotel may desire to combine the hotel chain's capabilities provided by the global SNET infrastructure 1001 with the location-specific capabilities provided by the local SNET infrastructure into a combined SNET group 1037, to enable a hotel guest to access global and local capabilities with a single docking process and via a single representative 1005 that provides global and local capabilities partially or fully combined.

In some embodiments, combinations of capabilities provided by separate, distributed infrastructures are managed, in part or in full, by one or more (distributed) processing systems, social devices, members, applications/services, etc., that are associated with one or more infrastructures. For example, in the illustrated embodiment, a processing system associated with the local SNET infrastructure 1003 may manage the combination of capabilities from infrastructures 1001 and 1003 into SNET group 1037, manage docking of client SNET groups 1035 with the SNET group 1037, or combinations thereof.

In some embodiments, access to a SNET group 1037 by a client SNET group 1035 can be granted, restricted and/or terminated by a network manager, processing system, social device, or some combination thereof according to an input, a trigger event, some other internal logic, etc. For example, when a social device docked with a client social device/service of SNET group 1035 leaves a premises associated with a SNET group 1037, the client SNET group's 1035 access to capabilities provided by SNET group 1037 may be terminated by terminating or restricting access granted via docking, changing authorization to interact with some or all capabilities provided by SNET group 1037, undocking the client social device 1035 from SNET group 1037, etc. This can occur automatically or in response to a trigger event, including, without limitation, elapse of a predetermined time after entering or leaving the premises, or the like. In some embodiments, a client SNET group 1035 can maintain residual access to SNET group 1037 after a device docked to the client SNET group 1035 leaves the premises. For example, where the premises associated with SNET group 1037 is a hotel, and a member associated with client SNET group 1035 belongs to an exclusive hotel membership, the client SNET group 1035 associated with the member may, after a docked device leaves the premises, still receive at least some access to capabilities provided by SNET group 1037, including, without limitation, payment services or a call routing phone service.

In some embodiments, a SNET group associated with a member (e.g., a human, a device or a service), can be docked to another SNET group to enable the member to access or receive services, contact information, other information associated with the SNET group, exchange information, etc. Such a member can be an existing member of a SNET, a nonmember (also referred to herein as a third party), an authorized guest or the like. For example, a human user with a device may approach within a threshold, such as a proximity threshold, of an access point for a premises, upon which the access point, or some other device associated with the premises delivers an invitation to the device/service or human user via the device, to dock to an SNGET group associated with the premises. The invitation can vary depending upon whether one or both the human user and the service/device are already members of the SNET. For example, where the device is not a social device, the access point can deliver an invitation in the form of a web page to the device, via a browser application or the like, that offers the device or device user the option of joining a SNET group as an ad hoc member. Where the device is a social device, the invitation can include a direct invitation to dock a SNET group with the premises-associated SNET group via a social interface or user interface located within the device.

The invitation can be accepted via one of various acceptance processes. For example, where a social device receives an invitation that includes a unique identifier indicating the SNET group to which the member is invited to dock, the social device can interact with an access point, another device, a SNET, SNET group, SNET sub-group, and the like via an independent pathway to accept the invitation. Acceptance in the above example may include simply delivering the unique identifier and information identifying the SNET group associated with delivery of the unique identifier, following which the SNET group is docked to the premises-associated SNET group. In addition, where a non-social device attempts to access an access point, and the access point pushes a web page to a browser application on the non-social device, the acceptance process can include accessing the web page, indicating a desire to dock with the SNET group (and perhaps providing other information). In response, the non-social device or an affiliated ad hoc guest SNET group is accepted and docked to the premises-associated SNET group.

Upon accepting an invitation, a human user, service/device or some combination thereof can gain at least partial access to capabilities provided by a premises-associated SNET group. For example, where the premises is a coffee shop, a member whose personal SNET group is docked to a premises-associated SNET group may gain access, via one or more devices docked to his personal SNET group, to various services including, without limitation, online newspapers, videos, a menu for item sales, shopping options for home delivery, ordering interface and payment services for on-site delivery, etc. In another example, where the premises is a hotel or private residence, a member whose personal SNET group is docked to a premises-based SNET group may gain access, via one or more devices docked to his personal SNET group, to services and information, without limitation, access to locally or remotely-stored content items, contact information, access to control functional elements of on-site (robotic) devices, etc. In another example, where the premises is a shopping mall, an access point may deliver, push, or the like an invitation to a device or user of the device to dock to a SNET group associated with the mall. The access point may require that the device or user attempt to access the access point before the invitation is delivered in the form of a unique identifier or web page. Services associated with the SNET group can include, without limitation, advertising, sales and coupon information provided by computing devices of retail locations within the mall, a mall mapping service that show those docked to the SNET group the locations of particular stores, a mall music service that provides those docked to the SNET group with music or other media content served by media sources associated with the SNET group, telephone directory services, a search engine relating to anything within any store in the mall, etc.

In some embodiments, an access point supports delivery of invitations to dock to a SNET group, processing acceptances of invitations, and routing of communications between members, ad hoc members, and potential members of a SNET/

SNET group. An invitation may be triggered by an attempt to associate with the access point. In other embodiments, the access point automatically provides the invitation to any device that the access point determines has crossed a threshold, such as a predetermined proximity threshold or location. Those docked to the SNET group, including ad hoc members, SNET groups, ad hoc SNET groups, and/or combinations thereof, may be able to couple with other devices/services that are also docked with the SNET group. Upon crossing another (or the same) threshold, docking to the SNET group can be terminated or restricted. For example, where a device that enters a premises is offered an ad hoc docking to a SNET group by an access point, the access point may restrict or terminate the ad hoc docking upon determining that the device has left the premises.

Figure 11:
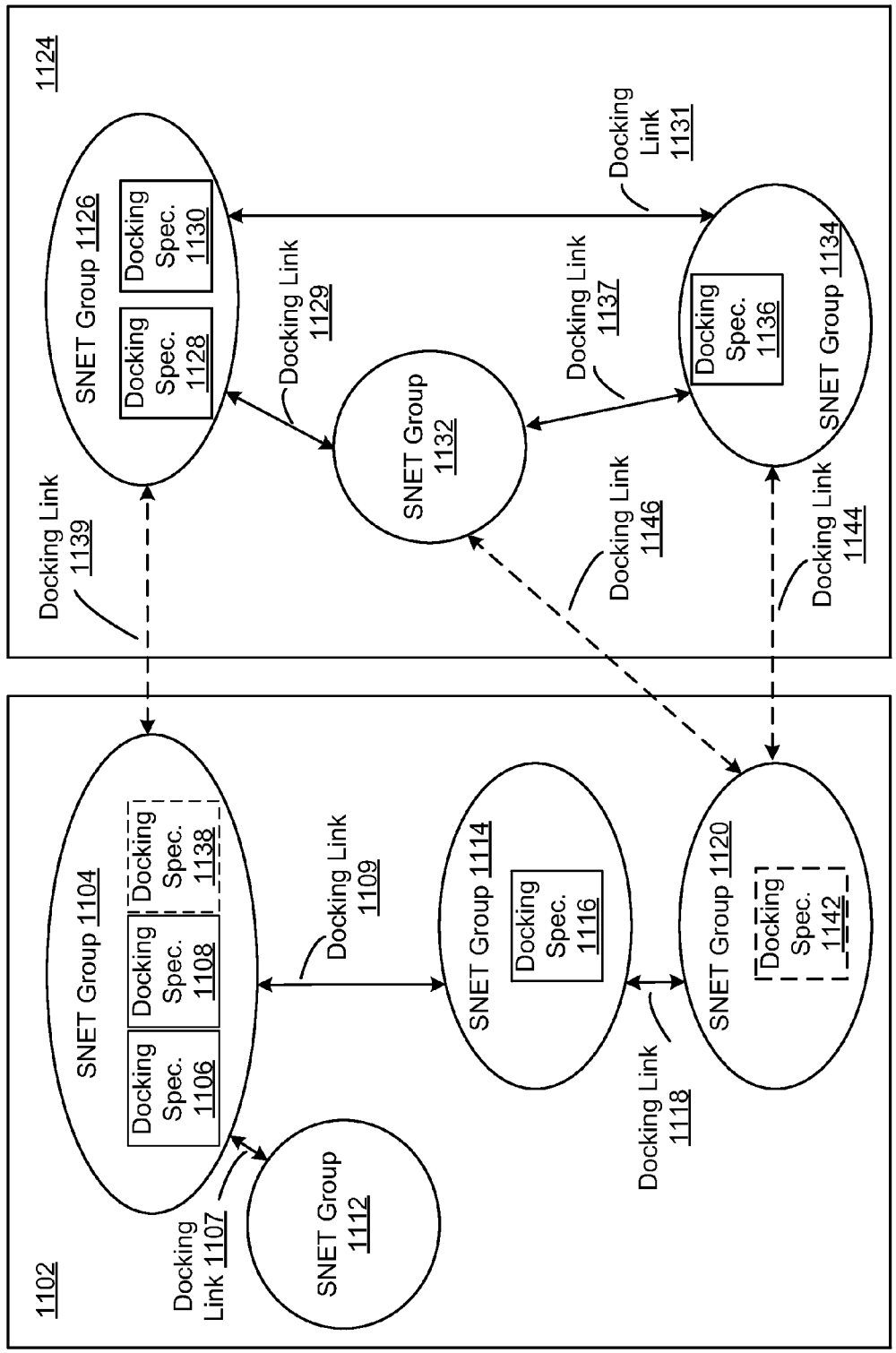
FIG. 11 illustrates a schematic block diagram of social networking grouping hierarchies according to various embodiments of the disclosure.

FIG. 11 illustrates a schematic block diagram of social networking grouping hierarchies according to various embodiments of the disclosure, including interactions between various SNET system, infrastructures, groups, services, and devices. In the illustrated embodiment, a SNET infrastructure 1102 can include one or more various SNET groups and social services/devices. For example, infrastructure 1102 can represent a SNET infrastructure associated with a SNET, SNET group, distributed processing system, SNET account, SNET member, human, device, and/or social service.

In some embodiments, various SNET groups are created by a SNET infrastructure based upon on an input from a user, member, processing system, device/service, SNET, SNET group, etc. For example, where SNET infrastructure 1102 is associated with a SNET member account, a member of the account may provide input to the SNET infrastructure 1102 to create SNET group 1104. The input can include, without limitation, attributes of the group 1104, social devices/services to be docked with the group 1104, information to be accessible to one or more members of group 1104, etc.

In some embodiments, a SNET group in a SNET infrastructure is docked with another SNET group. For example, in the illustrated embodiment, SNET group 1104 is docked with SNET group 1112 and SNET group 1114 via docking links 1107 and 1109, respectively. Docking one SNET group to another SNET group can be accomplished via one or more various docking processes including, without limitation, sole initiation of docking by one or more devices or SNET groups.

In some embodiments, a docking process can include interactions between at least portions of both a first SNET group and a second SNET group. For example, where SNET group 1112 is to be docked to SNET group 1104 via docking link 1107, SNET group 1112 and SNET group 1104 may exchange security information processing and the like for one or more members, docked devices, functional elements, accessible information, etc. Such exchanges can enable additional security verifications of appropriate interactions and access between the two SNET groups and their respective members. In some embodiments, additional security processes, such as human confirmation requirements, are employed to ensure secure access to capabilities of one or more docked SNET groups and/or resources.

In some embodiments, a docking process can include various actions performed by one or more of a SNET, SNET system, SNET infrastructure, processing system, SNET group, social device, user, member, or some combination thereof. Such actions may include, without limitation, verifying an optimal docking location or arranging a presentation of docking links to a prospective member. For example, a user associated with SNET infrastructure 1102 may interact with the infrastructure to dock SNET group 1120 to some part of SNET infrastructure 1124. The docking process can include, without limitation, determining an optimal docking configuration between SNET group 1120 and one or more various SNET groups in SNET infrastructure 1124 to enable access by a member of SNET group 1120 to certain services and capabilities of SNET infrastructure 1124.

As shown in the illustrated embodiment, SNET group 1120 can be docked with both SNET group 1132 (via docking link 1146) and SNET group 1134 (via docking link 1144) as part of a single docking process to associate SNET group 1120 with certain capabilities provided by various SNET groups in SNET infrastructure 1124, where the optimum docking configuration is determined to include docking SNET group to both SNET group 1132 and SNET group 1134 to access such capabilities. The docking links 1146 and 1144 can be governed by a single docking specification 1142, or some other combination of docking specifications that are part of SNET infrastructure 1124. In some embodiments, docking links and docking specifications can be docked or otherwise associated in one-to-one type relationships, one-to-many type relationships, many-to-one type relationships, etc.

In some embodiments, a docking process that associates SNET group 1120 with certain capabilities of SNET infrastructure 1124 via docking with both SNET group 1132 and SNET group 1134 may include arranging a presentation of the docking links such that a member accessing the capabilities does not see a full view of the complexity of the docking links and interactions between various SNET groups, devices/services, and SNET infrastructures. In the illustrated embodiment, for example, a docking process for docking SNET group 1120 with SNET groups 1132 and 1134 may include arranging a presentation or representative view of the capabilities of SNET group 1120 that hides the fact that SNET group 1120 is being docked, via two docking links, to two SNET groups. A simplified presentation or representative view may present only a view of SNET group 1120 being docked with certain capabilities of SNET infrastructure 1124. In some embodiments, a member may adjust, toggle, or otherwise manipulate the complexity of the presentation or representative view such that a partial or full view of the complexity of the docking links and interactions between the SNET infrastructures, SNET groups, and social devices (or services) is presented to a member.

In some embodiments, establishing multiple docking links can provide additional security for access to certain capabilities. For example, where a docking link 1146 between SNET group 1120 and SNET group 1132 includes a high security link to a certain capability than may be provided for by a second route (e.g., via SNET group 1144 through docking links 1144 and 1137), the docking process may include replicating security requirements across alternate routes. In some embodiments, establishing multiple docking links can provide more efficient access than a single docking link to capabilities and services. For example, where a docking process includes a determination that a docking link to both SNET group 1132 and SNET group 1134 can enable a more efficient access to certain capabilities of SNET infrastructure 1124 than a single docking link, a docking process can include establishing multiple docking links 1146 and 1144 to SNET groups of SNET infrastructure 1124.

In some embodiments, a docking link between various SNET groups and social devices/services is managed based on various docking specifications. A docking specification can, in some embodiments, manage one or more particular docking links and set forth, for example and not by way of limitation, access limitations, restrictions, and grants associated with various capabilities of a SNET group, security access requirements, periods of access, trigger events upon which access is to be altered, restricted, granted, and/or terminated.

For example, as shown in the illustrated embodiment, SNET group 1104 includes docking specifications 1106 and 1108. Docking specification 1106 can, in some embodiments, govern the docking link 1107 between SNET group 1104 and SNET group 1112. Likewise, docking specification 1108 can, in some embodiments, govern the docking link 1109 between SNET group 1104 and SNET group 1114. A docking specification can be predetermined, in part or in full, by a member of SNET group 1104 in advance of a docking, created on the fly as part of a docking process to dock SNET group 1104 to another SNET group, provided by the SNET infrastructure or a SNET group that attempts to dock with SNET group 1104, etc. For example, a member of SNET group 1104 may establish docking specification 1106 that restricts access by members of SNET group 1112 to capabilities provided by SNET group 1104 based upon a later trigger event including, without limitation, elapse of a period of time. In some embodiments, a docking specification is specific to certain attributes of other SNET groups and devices, such that the SNET group 1104 is docked to various SNET groups with correlating attributes. For example, Docking specification 1106 may dictate that SNET group 1104 is to be docked, via docking link 1107, to a SNET group 1112 that is associated with a geographic location that is within a predetermined proximity threshold to a geographic location associated with SNET group 1104, and that the docking link 1107 is to be restricted or terminated if the geographic location associated with SNET group 1112 exceeds the proximity threshold.

In some embodiments, some or all of a docking specification can be dynamically adjusted, managed, altered, created, or deleted based upon an input from a user, member, or other node in a SNET group/infrastructure. For example, a member of SNET group 1104 may establish docking specification 1106 to govern docking link 1107 with SNET group 1112 to restrict access by a member of SNET group 1112 to certain capabilities of SNET group 1104, and then interact with SNET group 1104, SNET infrastructure 1102, etc., to alter docking specification 1106 to provide greater access by a member of SNET group 1112 to capabilities provided by SNET group 1104. Such management of a docking specification can be performed at any time in a scheduled or ad hoc process with regard to an existing docking link, a docking specification governing potential docking links, etc.

In some embodiments, a docking specification governing a docking link between a "higher-tier" SNET group and a "lower-tier" SNET group is part of the higher-tiered SNET group. For example, in the illustrated embodiment, where SNET group 1104 is a higher-tiered SNET group and SNET groups 1112 and 1114 are lower-tiered SNET groups, the docking links 1107 and 1109 between the lower-tiered SNET groups 1112 and 1114 and the higher-tiered SNET group 1104 are governed by docking specifications 1106 and 1108 that are part of the higher-tiered SNET group 1104, thereby enabling control by a higher-tiered SNET group over docking links associated with lower-tiered SNET groups.

In some embodiments, a docking specification can be tailored by a user, member, SNET system, SNET infrastructure, SNET group, or social device/service to provide various levels of interaction and access between various docked SNET groups. For example, in the illustrated embodiment, docking specification 1106 may dictate that docking link 1107 provides full bi-directional interactions, sharing of information, services, and the like between SNET groups 1104 and 1112 (via docking link 1107). In another example, docking specification 1108 may dictate that docking link 1109 provides a one-way group-to-group service access between SNET group 1104 and SNET group 1114 via docking link 1109, such that a member of SNET group 1114 can access at least some services provided by capabilities of SNET group 1104, but a member of SNET group 1104 cannot access some or all information, services, devices, or other resources associated with SNET group 1114. For example, where a hotel guest's SNET group is docked with a hotel's SNET group to grant the hotel guest access to hotel service capabilities via the hotel's SNET group, a docking specification governing the docking link between the hotel guest's SNET group and the hotel's SNET group may specify that the hotel guest is restricted from accessing certain capabilities of the hotel's SNET group, while the hotel's SNET group is restricted from accessing any of the capabilities of the hotel guest's SNET group including, without limitation, access to devices docked to the hotel guest's SNET group. As discussed above, such access and interaction aspects of a docking specification can, in some embodiments, be altered at any time by various users, members, SNET groups, SNET infrastructures, etc.

In some embodiments, a docking specification places certain restrictions on capabilities of a SNET group that are offered and provided to members of docked SNET groups. For example, docking specification 1106 may dictate that only certain capabilities of SNET group 1104 are to be provided to a member of SNET group 1112 via docking link 1107. Docking specification 1106 may also dictate that each member of SNET group 1112 be provided with a distinct access to a distinct one or more capabilities of SNET group 1104. For example, docking specification 1106 may dictate that each member of SNET group 1112 be provided a unique access to one or more capabilities of SNET group 1104.

In some embodiments, a docking link between various SNET groups enables access by additional SNET groups to capabilities provided by SNET groups to which additional SNET groups are indirectly associated or docked. For example, in the illustrated embodiments, where SNET group 1104 is docked to SNET group 1114 via docking link 1109, SNET group 1114 is docked to SNET group 1120 via docking link 1118. Docking link 1118 is governed by docking specification 1116 in SNET group 1114. In some embodiments, a member of SNET group 1120 may be granted access to at least some capabilities of SNET group 1104 to which a member of SNET group 1114 is granted access. Access to capabilities of SNET group 1104 by a member of SNET group 1120 can be determined by various docking specifications including, without limitation, docking specification 1116 that governs the docking link 1118 between SNET group 1114 and SNET group 1120, and docking specification 1108 that governs the docking link 1109 between SNET group 1104 and SNET group 1114. For example, docking specification 1108 may control access by a member of SNET group 1114 to certain capabilities of SNET group 1104 via docking link 1109 by restricting access to capabilities of SNET group 1104 by a SNET group that is docked to SNET group 1114. In another example, docking specification 1116 may specify that a member of SNET group 1120 may access none, some, or all of the services and capabilities of other SNET groups including, without limitation, SNET group 1104 to which SNET group 1114 is docked.

In some embodiments, various SNET groups can be docked to each other, such that some or all of the docked SNET groups gain access or some or all of the services and capabilities of the other docked SNET groups. In the illustrated embodiment, for example, SNET infrastructure 1124 includes SNET group 1126, which is docked, via docking link 1129 governed by docking specification 1128, to SNET group 1132 and is also docked, via docking link 1131 governed by docking specification 1130, to SNET group 1134. In addition, SNET group 1134 is docked, via docking link 1137 governed by docking specification 1136, to SNET group 1132; as a result, SNET groups 1126, 1132, and 1134 are each docked to each other. The docking links between the SNET groups 1126, 1132, and 1134 can provide various levels of access including, without limitation, various levels of security. In addition, in some embodiments, docking to one of the SNET groups in SNET infrastructure 1124 can grant access to some or all of the capabilities of some or all of the SNET groups to which the one of the SNET groups is docked.

For example, in the illustrated embodiment, SNET group 1104 can be docked to SNET group 1126 via docking link 1139. Communication flowing through the docking link 1139 can be subject to various docking specifications depending on the origin and destination of the communication flow. For example, for media content originating from the SNET group 1104 via group member devices, or for storage or services associated directly with the SNET group 1104, a docking specification 1138 may govern any attempted access (via a docking link 1139) to such media content. Such access can include, without limitation, receipt of media content, delivery of media content, identifying media content, information associated with the media content, payment authorizations, etc.

For example, where a foreign SNET group, including, without limitation, a SNET group associated with a separate SNET infrastructure, docks to a SNET group 1104 that includes a first, second, and third media content originating from group member devices, storage and/or services associated directly with the SNET group 1104, the docking specification 1138 may specify that: 1) the existence of the first media content is not to be identified to the foreign SNET group, 2) the second media content can be identified to at least the foreign SNET group as existing but requires a high level of DRM and is offered at a reduced quality, and/or 3) the third media can be identified to at least the foreign SNET group as existing and is offered in its original form without redistribution and consumption restrictions. Likewise, docking specification limitations placed on data or media content originating from the SNET group 1114 may permit chained access by the SNET group(s) 1126, 1132, 1134 (or some combination thereof) via one or more of SNET group 1104, SNET group 1120, etc.

In addition to docking specification limitations applicable to local group offerings, various docking specification limitations may also apply to chained offerings. For example, the SNET group 1114 may freely provide access by any other SNET group, via a direct docking link to SNET group 1114, or via an indirect link via a docking link to a SNET group that is docked to SNET group 1114, to all offerings including, without limitation, services, content, data, access to docked devices, etc. Such freely-provided access can be defined, in some embodiments, via the docking specification 1116. However, the docking specification 1138 may place restrictions on access via SNET group 1104 including, without limitation, not permitting any access or knowledge of some or all offerings from any external SNET group to which SNET group 1104 is docked including, without limitation, SNET groups 1114, 1112, and 1120. In this manner, and depending on the docking linkage and chained SNET groups and device specifications, offerings may be managed in various ways depending on underlying needs.

In some embodiments, such linkages and chain management of overall offerings apply twice: one for each direction of access. For example, offering restrictions associated with the SNET infrastructure 1102 can be completely different from those of the SNET infrastructure 1124. In addition, even though all relevant docking specifications within the SNET infrastructure 1102 may permit at least limited access to a particular offering to the SNET Group 1126, such access may not extend to, for example, the SNET group 1132 due to: the docking specification 1128 placing further access restrictions beyond those required by the SNET infrastructure 1102, a relevant docking specification within the SNET infrastructure 1102 that limits foreign linkages, etc.

For example, in an ad hoc travel network docking configuration, a personal SNET group construct of a traveler (e.g., the SNET infrastructure 1102) might desire to provide very limited access to a hotel's SNET group construct (e.g., the SNET infrastructure 1124), while in the other direction the hotel's SNET group construct offerings may be freely provided. Each construct need only provide access to whatever offerings, membership identification, information, and the like that they would like to expose. A traveler may choose to expose, for example: a payment service element located somewhere within the overall personal SNET group construct; the traveler's social smartphone's incoming message service; an administrator's incoming message service; and/or a travel document storage service. The hotel may choose to expose capabilities, offerings, and the like including, without limitation: a regional directory, a map and other information services, a concierge service, a billing service, a reservation service, networked office equipment, etc. Exposure in either case can be defined, for example, via various docking specifications associated with the originating SNET group as modified by the docking specifications associated with the SNET groups in the chained pathway to the destination.

In some embodiments, docking specifications can be extended to provide resolution beyond that of a group level. For example, the docking specification 1128 governing docking link 1129 may require human authentication and various levels of security before providing access via docking link 1129. In another example, as defined by the docking specification 1128, a traveler (e.g., a member of the SNET group 1104) may gain access to a particular offering provided by one element, service or device participant in the SNET Group 1126 via a required secure interaction with the traveler's local social smart phone as docked to SNET group 1104. However, some or all other members of SNET group 1104 or other SNET groups may not gain access to the particular offering. In other words, for one or more particular SNET group offerings, capabilities, offering identifiers etc., and for one or more particular group members, chained docking specification details can be established to manage overall access, including, without limitation, limited access. Although shown functionally as being distributed, docking specification flow can be managed by a single user interface, and may be stored in a single database construct.

In some embodiments, default docking specifications can apply a default treatment for access, offerings, interactions, etc. with regard to one or more particular SNET groups, but permit specific offering/access modifications where needed by authorized SNET nodes and/or groups. Likewise, overall default treatment can be modified.

In some embodiments, a docking specification can be part of one or more SNET groups, SNET infrastructures, social device, etc. For example, where a docking process to dock SNET group 1104 to SNET group 1126 is initiated by a device docked to SNET group 1104, docking specification 1138 may be a part of SNET group 1104. In addition, where a docking process to dock SNET group 1104 to SNET group 1126 includes some part of SNET infrastructure 1124 receiving and granting a docking request from some part of SNET infrastructure 1102, docking specification 1138 may be a part of SNET group 1126. In some embodiments, a docking request can include, without limitation, a request to dock one SNET group to another SNET group, a request to provide a first SNET group's capabilities, including without limitation services and device resources, to one or more devices docked to a second SNET group. A docking request can originate from a device docked to the first SNET group, a device docked to the second SNET group, a member of the first SNET group, a member of the first SNET group, a third-party, or some combination thereof.

By docking to SNET group 1126, SNET group 1104 may access some or all of the capabilities of SNET group 1132 and SNET group 1134, as specified by one or more of docking specifications 1138, 1128, and 1130. Conversely, where SNET group 1104 docks with SNET group 1134, SNET group 1104 may access some or all of the capabilities of SNET group 1126 and SNET group 1134, as specified by one or more of docking specifications 1138 and 1136.

In some embodiments, docking various SNET groups with other SNET groups can include access restrictions and limitations. For example, where SNET group 1104 is docked to SNET group 1114, which is docked to SNET group 1120 (all within SNET infrastructure 1102), various levels of interaction and access by the various SNET groups can be determined via management of the various docking specifications 1108 and 1116 governing the docking links. All three docked SNET groups 1104, 1114, and 1120 can be enabled to have access to some or all of each other's capabilities, SNE group 1114 may have access to capabilities of SNET group 1104 while SNET group has access to capabilities of SNET group 1114, SNET groups 1104 and 1114 may have access to each other's capabilities while SNET group 1120 has access to some of the capabilities of SNET group 1104 and some of the capabilities of SNET group 1114. Such interactions, access and dockings may be performed without any interaction with a third-party entity or third-party SNET group.

In some embodiments, where a third-party entity or third-party SNET group is involved in a docking link, additional interaction with such third-party may be required. For example, where SNET group 1104 is to be docked to SNET group 1126, and the respective SNET groups are part of separate SNET infrastructures, docking, access, or the like may require interaction with a third-party. Interaction may include, by way of example, a security challenge, invitation and/or acceptance to a member of SNET group 1104 that is attempting to access services or other capabilities of SNET group 1126. In some embodiments, a docking process between SNET groups associated with separate SNET infrastructures can be initiated, managed, or the like by various nodes of a SNET infrastructure. For example, a docking between SNET group 1104 and SNET group 1126 may be managed by one or more devices docked to SNET group 1104, one or more devices docked to SNET group 1126, one or more devices docked to a third-party SNET group, one or more processing systems, one or more SNET infrastructures, etc.

In some embodiments, a SNET "travel" group facilitates and/or monitors travel activities, activities associated with an aspect of a social device, an aspect of the social device, and/or a SNET group associated with a member. An activity can include one or more events including trigger events, the occurrence of which can influence at least one aspect of the SNET group. The SNET travel group can be docked to SNET groups comprising entities relevant to one or more activities, travel companions, family members, friends and people to be visited, restaurants, coupon/rebate services, etc. A member of a SNET travel group (which can be temporary or persistent) can receive, for example, detailed hotel information (including confirmations, rates, feedback, amenities, restaurant recommendations, nearby attractions, etc.), an attendee list for a social event/excursion, babysitter monitoring services, etc. In some embodiments, one or more elements associated with the SNET travel group can be managed by one or more processing systems, server devices, network nodes, remote devices or the like in response to one or more trigger events or inputs from one or more SNET group members/nonmembers.

Figure 12:
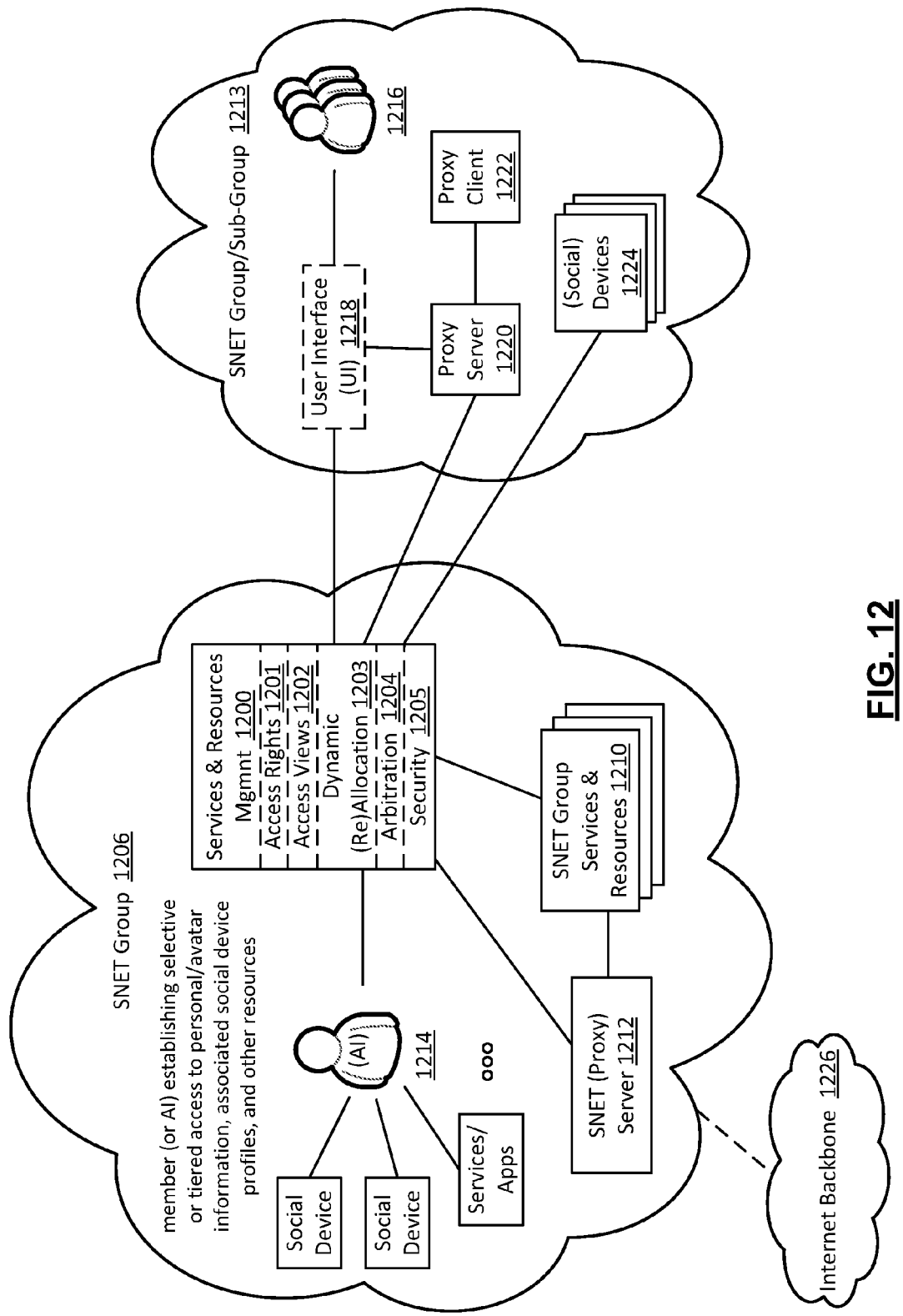
FIG. 12 is a schematic block diagram illustrating access to social services and other resources participating in a social network group/sub-group in accordance with an embodiment of the present disclosure.

FIG. 12 is a schematic block diagram illustrating access to social services and other resources participating in a social network group/sub-group 1206 in accordance with an embodiment of the present disclosure. In this embodiment, a member of a social group controls different access levels to both personal information (which may be included in a user profile) and associated device profiles and capabilities. Such access rights allow the member to establish selective, restricted and/or tiered access rights and views—for other members of the social/group as well as non-members—to all or some of the member's social devices, services and other resources.

In the illustrated embodiment, a member or device of a SNET group 1206 (or, alternatively, an unaffiliated entity or node of SNET group/sub-group 1213) accesses social group services and resources 1210 associated with the SNET group 1206 via a services and resource management node 1200. The services and resource management node 1200 of this embodiment comprises access rights 1201, access views 1202, dynamic (re)allocation functionality 1203, arbitration functionality 1204, and security functionality 1205.

In operation, the access rights 1201 and access views 1202 control differing access levels and access visibility for a member's personal information, device information, data, services, processing and storage capabilities, and other social resources. Access rights 1201 and access views 1202 can be predefined, for example, based on a SNET group, based on co-member devices, or based on member's own device to device interactions. Such predefinition can be tailored dynamically as needed or as relationships change. Access rights 1201 may also be expanded to support temporary interaction with a guest member or visitor device. For example, a visiting member with a smart phone may be permitted to receive/provide media to a social device residing in a "home circle."

In some embodiments, a member of the SNET group 1206 can adjust and modify access rights 1201 on an information-by-information basis, device-by-device basis, member-by-member basis, etc. Through access views 1202, the member might also present itself in various ways depending on context, location, or use-based considerations. For example, a member icon/avatar may present differing characteristics or capabilities that are context dependent, including work, home or social settings. Allocation and (as necessary) dynamic reallocation of social services/resources is performed by dynamic (re)allocation functionality 1203 and arbitration functionality 1204. Access to social services/resources can be preconditioned on secure access/authentication performed by security functionality 1205.

In addition to social group services and resources 1210, the SNET group 1206 might include, for example, a SNET server 1212 and one or more human (or AI personas/functions) members 1214 and affiliated social devices, services, applications, files, web pages, connections and other social resources. As will be appreciated, a human member 1214 can establish selective or tiered access to personal information and associated social device profiles and other resources as described above. In certain embodiments, the services and resource management node 1200 may be incorporated in system circuitry of an SNET (proxy) server 1212 or other SNET social device, or administered by a SNET hosting infrastructure, either in a standalone or distributed manner. Further, the SNET server 1212 may include a firewall operable to provide secure access and perform basic routing functions.

Access to social group services and resources 1210 by nodes of the SNET group/sub-group 1213 may occur in a variety of ways, including via a user interface (UI) 1218 utilized by one or more humans 1216. The UI 1218 might comprise a graphical user interface (GUI) or browser that graphically indicates available resources, voice controls, gesture commands, etc. Access to the SNET group 1206 can also be managed by a proxy server 1220. The proxy server 1220 functions as an intermediary for access requests from proxy clients 1222—including social services and/or devices connected to the proxy server 1220 via the Internet or other IP-based networks—seeking to communicate with the SNET group 1206. Social devices 1224 affiliated with a SNET group/sub-group 1213 may have the capacity to interact directly with the SNET group 1206. It is noted that the human members 1216, proxy server 1214 and social devices 1224 may operate independently of a SNET group/sub-group. Further, the proxy server 1214 may be a distributed or cloud-based entity, or a member of (or incorporated in a member of) either the SNET group/sub-group 1213 or SNET group 1206.

Figure 13:
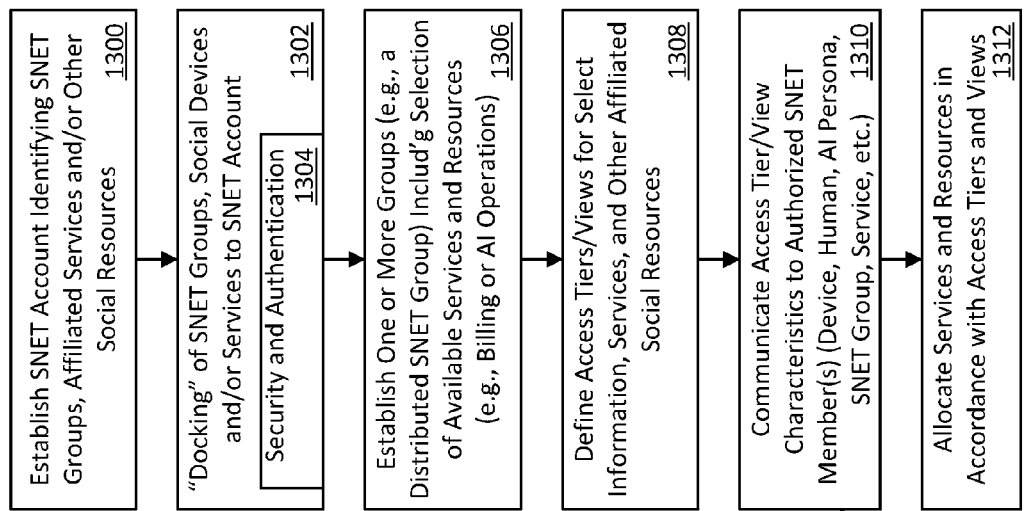
FIG. 13 is a logic diagram of a method for allocating social resources and services in accordance with an embodiment of the present disclosure.

FIG. 13 is a logic diagram of a method for allocating social resources and services in accordance with an embodiment of the present disclosure. In an initial step 1300, a SNET member or other SNET node establishes a SNET account that identifies relevant SNET groups, affiliated services and/or other social resources. Next, or contemporaneously, in step 1302 SNET groups, social devices and/or services are "docked" (e.g., online, through near-field communications (NFC) and/or Bluetooth coupling, or via networked operations) to the SNET account. Such docking may involve security and authentication operations 1304 and other operations such as those described elsewhere herein.

The method continues in step 1306 with the creation of one or more circles or (sub)groups (e.g., a distributed SNET group) including a selection of available services and resources (e.g., billing services or AI functions) that may have related or specific characteristics and interdependencies, etc. In one embodiment, members may be added to a group through a drag-and-drop user interface or other means. In step 1308, access tiers and views are manually or automatically defined for select information, services, and other affiliated social resources. This step may be conducted in whole or part by means of a (pop-up) table or form that requests tier settings and allows for personal tailoring of same. The member may select a particular group member (device/service or human/self) to reveal tier characteristics and allow modification of access rights. In some circumstances, selection of access rights may be based on profile data and other characteristics of a particular device, user or group seeking access to social resources. Further, distinct access rights, including content and capabilities access views, may be assigned to different social device resources or groupings of resources, or to a particular request for access to social resources.

In step 1310, access tier/view characteristics are communicated to authorized SNET group members, which may include social services or devices (including the member's social devices), human members, AI functions/personas, a SNET and/or one or more SNET groups. Next, in step 1312, social services and resources are allocated in accordance with the access tiers and views communicated in step 1310. Allocation of a social resource/service may entail, for example, allocating the resource for dedicated use by a member of the SNET group, either on a persistent or temporary basis, subject to reallocation. Subsequent reallocation may occur, for example, if access to a previously allocated social resource is requested by a second member (or non-member) having a higher priority or superior access rights to the resource. In certain embodiments of the invention, social resources may be dynamically offered and allocated if/when and to the extent such resources become available. Management of social resource reserves, including termination of related services, may be performed by individual devices, groupings of devices, and/or centralized or distributed SNET processing circuitry and software.

Figure 14:
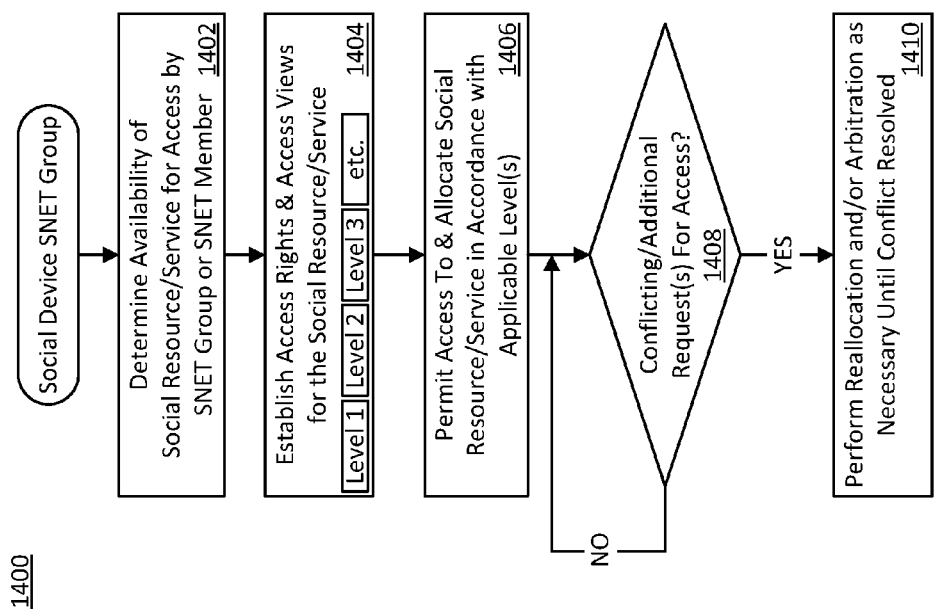
FIG. 14 is a logic diagram of a method for establishing tiered views of and access to social resources and services in accordance with an embodiment of the present disclosure.

FIG. 14 is a logic diagram of a method for establishing tiered views of and access to social resources and services in accordance with an embodiment of the present disclosure. First, the availability of a social resource/service for access by SNET groups or members is determined in step 1402. Next, access rights and access views for the social resource/service are established in step 1404. Such access rights and views may provide for levels of access having varying degrees of granularity as contextually appropriate and as determined by one or more SNET nodes having control of the social resource/service, or as determined by an authorized entity requesting access to the social resource/service.

Established levels of access rights are then applied to permit access to and allocation of the social resource/service in step 1406. If conflicting, modified or additional requests for access are identified in step 1408, reallocation and/or arbitration is performed in step 1410 as necessary to address conflicts or otherwise service such requests. In one embodiment wherein a particular device or user requires or requests a relatively large percentage of available resources/services, access may be denied or restricted, including on a temporary or persistent basis. Alternatively, other capable and available social resources/service may be employed to resolve such requests. Potential overuse or abusive use of a SNET resource may be detected by SNET monitoring functionality that employs static or dynamic thresholds.

Figure 15:
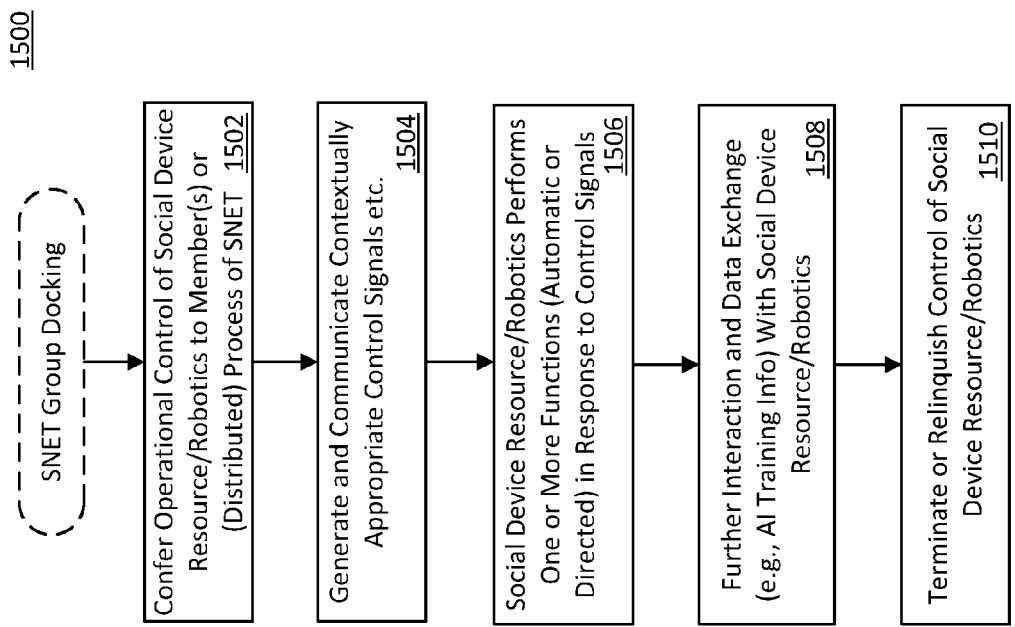
FIG. 15 is a logic diagram of a method for arbitrated access to social resources/robotics in accordance with an embodiment of the present disclosure.

Referring now to FIG. 15, a logic diagram is shown for a method for arbitrated access to social resources/robotics in accordance with an embodiment of the present disclosure. Upon activating or docking a social device resource/robotics, account information is automatically (or via a setup prompt) provided to the SNET group. Next, in step 1502, operational control of the social device resource/robotics is conferred to a node or distributed process of the SNET group. This node or process then generates contextually appropriate control signals etc. as shown in step 1504. Such control signals and contextually-related applications are communicated to the social device resource/robotics, possibly via a standardized communication protocol.

In response to the control signals, the social device resource/robotics performs one or more functions, either automatically or as authorized by a user, in step 1506. Further interaction and data exchange with the social device resource/robotics may occur in step 1508 including, for example, artificial intelligence/neural network training operations, control function customization, software maintenance, load balancing, etc. In subsequent step 1510, control of the social device resource/robotics is terminated or relinquished to a user or other SNET node.

In certain embodiments, some social device resources/robotics may support only one member interaction at a time, with or without simultaneously supporting the underlying owner/member. Other devices may support many multiple members (devices/AI/humans) as well as having dedicated functionality reserved for an owner. A standardized or manufacturer proprietary approach to control and certification marking may account for such variations in SNET device capabilities. Monitoring, snooping of content (e.g., for purposes of protecting copyright owners) and like functionality could also be accomplished through compliance with such a standardized protocol.

In a further embodiment of a SNET/SNET group according to the invention is illustrated, an authorized guest member may control remote robotics and/or the social devices of another via one of the guest's own social devices, or vice versa. Such control can be established in advance (at the factory) or managed in real time via guest interaction. Utilization of certain control features, such as features allowing content to be driven and played on another's device, may be restricted, for example, to members or friends of a particular SNET group that allows content or process snooping.

By way of illustration, a social camera might capture and store home video, post a link thereto via a family SNET, and then enter a low power/sleep mode. A family circle member residing in another country, for example, could then activate an associated social television that participates in the family circle. Next, a channel entry for the posted media may become visible and trigger video playback. In turn, a command is triggered to wake up and stream video content to the social television.

As will be appreciated, authorized control of another's social device enables a variety of other applications. By way of example, a device user joins a church social circle and docks one or more of her social communication devices (e.g., a smart phone). In conjunction therewith, the church docks a social control application interface or social application (managed, for example, by a priest/pastor) into the circle. Thereafter, via automatic in-range determinations (GPS tracking, WiFi/NFC presence, etc.), the social control application/interface delivers context appropriate control signals to the user's social device(s). Other control signals may be provided to automatically collect donations or automatically deliver a prompt for same, automatically deliver a hymnal, provide a worship service agenda, etc. For example, the user phone may be instructed to enter into emergency only and do-not-disturb (e.g., vibrate only) modes of operation. Similarly, social automated device control may be used to configure, program or collect status information for appliance devices, (e.g., a washing machine or thermostat). A user may designate control jurisdiction and/or data collection capabilities to a friend, circle member(s) or application interface/application.

Figure 16:
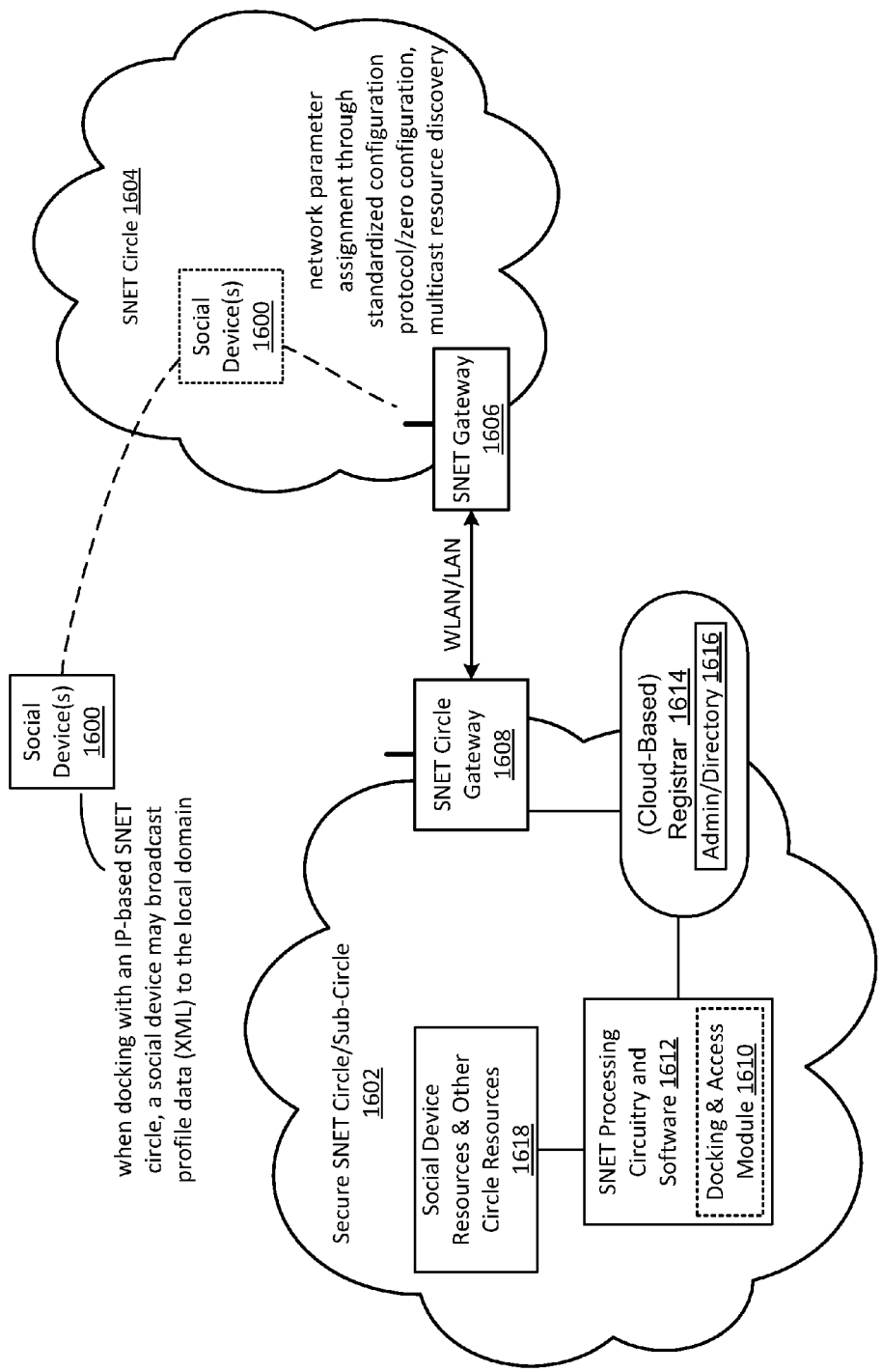
FIG. 16 is a schematic block diagram illustrating remote access to social resources of a social network circle/sub-circle in accordance with and embodiment of the present disclosure.

FIG. 16 is a schematic block diagram illustrating remote access to social resources of a social network circle/sub-circle in accordance with and embodiment of the present disclosure. In the illustrated embodiment, a social device 1600 may indicate a desire to associate, dock, access social device resources and other circle resources 1618, or otherwise communicate with a (secure) SNET circle/sub-circle 1602. The social device 1600 device can be autonomous and independent or, alternatively, a participant in a second SNET circle 1604 or other network serviced by the SNET gateway 1606.

In one embodiment, either the SNET gateway 1606 or SNET circle gateway 1608 functions as a proxy for the social device 1600. Proxy functionality within the SNET gateway 1606 may be provided by a software application or a computer system (server) that functions as an intermediary for requests from clients (including connected social devices) seeking resources from other servers or gateways such as SNET gateway 1608. Such resources might include files, services, web pages, connections, profiling information and other available social device resources and other circle resources 1618.

The SNET gateway 1606 may evaluate requests from social devices according to various filtering rules. For example, the SNET gateway 1606 might filter traffic by IP address or protocol. Once a request from the social device 1600 validated (if necessary), the SNET gateway 1606 connects to the SNET circle gateway 1608 over a WLAN/LAN or other communication path and requests access to resources of the SNET circle/sub-circle 1602 on behalf of the social device 1600.

Membership in the SNET circle/sub-circle 1602 is established through a docking module 1610 of SNET processing circuitry and software 1612, which may support one or more device discovery and configuration protocols, including standardized protocols. When circle membership is restricted, a local or cloud-based registrar 1614 can be employed to provide authentication. The registrar 1614 of the illustrated embodiment may utilize an administrator, or a directory service 1616 such as a Lightweight Directory Access Protocol (LDAP)-based directory server that stores attribute data. LDAP is a well-known application protocol for querying and modifying items in directory service. When docking with an IP-based SNET circle, a social device may broadcast profile data to the local domain using a textual data format such as Extensible Markup Language (XML). In one exemplary docking process, a social device broadcasts a request to register with or access a SNET circle/group. The request may occur as part of initiation or power-up of the social device, on a proximity or ad hoc basis, or following another trigger event. The registration request may be received by at least one gateway device. The gateway functions to configure the social device such that it can communicate with other hosts. In an IP-based network, typical configuration information might include an IP address and default route and routing prefix. The gateway may be a standalone device, multi-function computing device, etc., and can operate in an ad hoc manner or be persistent.

In one illustrative embodiment, the network configuration protocol utilized by the gateway may be the Dynamic Host Configuration Protocol (DHCP) and related standards, promulgated and maintained by the Internet Engineering Task Force (IETF), or similar protocol that automates network-parameter assignment to network aware social devices/services. In addition to eliminating the need for manual device configuration, DHCP provides a central database of devices that are connected to the network and eliminates duplicate resource assignments.

Upon a trigger event (e.g., power-up, registration with a SNET circle, etc.), the social device can transmit configuration/capability information to one or more other devices. Such information may be advertised to specific devices identified by the social device. The configuration/capability information may also be transmitted to any device in a SNET circle, or any device capable of receiving the transmission. A device can, in some embodiments, determine the configuration/capability information of other devices by querying them, individually or as a group.

SNET circle resources may also be accessible via a zero configuration, multi-cast discovery protocol that locates devices, such as printers, and the services offered by those devices on a local network using a multicast discovery protocol and related service records or profiling information. Such a protocol may operate at the application layer, and transmissions of configuration/capability information can be used, for example, to identify and utilize common programming interfaces, protocols, packet formats, and the like between two or more devices. In addition, a bridge or proxy node that communicatively couples two or more devices may utilize a multicast-type discovery and access protocol. In certain embodiments, a bridge or proxy node may communicate or relay queries and advertisements regarding configuration/capability information, and may further operate to process, transcode or modify transmissions relating to configuration/capability information of devices.

Wide area service discovery of SNET circle resources may be enabled through an appropriately configured domain name service (DNS) server or the like, or a multicast-type protocol that performs DNS-like operations. Further, SNET circle resources may be configured to support interoperability guidelines and network protocols, such as Universal Plug and Play (UPnP), that provide uniform mechanisms and restrictions for accessing resources and data over a network.

Depending on the particular implementation, gateway (DHCP server) may utilize various methods to assign and allocate IP addresses. Briefly, a network/SNET circle administrator can assign a range of available IP addresses. Each social device can be configured to request an IP address when joining a SNET circle or during SNET circle initialization. Next, an IP address can be granted using a "lease" approach that includes a configurable time period, thereby enabling the gateway to dynamically reclaim and then reallocate IP addresses that are not renewed (e.g., a social device powers off or otherwise terminates communication with a SNET circle).

Alternatively, the DHCP server may permanently assign an available IP address to a social device. Under this approach (and the "lease" approach), the DHCP server maintains a table of previous IP address assignments, such that it may preferentially assign an IP address that was previously assigned to a requesting social device. In yet another approach, a DHCP server may restrict IP address assignment to devices included in a table with MAC address and IP address pairs.

Once the social device is configured, the gateway communicates with a firewall to open up communication ports, thereby permitting network transmissions to/from the social device. Registered ports are typically used by networked applications as transitory source ports when contacting servers, but they can also identify named services that have been registered by a third party.

In addition to opening ports for devices, the firewall may function to advertise the social device to local and remote users/devices and services over, for example, a WAN/(W) LAN communication channel. In one embodiment, social device IP addresses and profiles are communicated to SNET circle members and remote users/devices. In another embodiment, a gateway may function as a proxy (such as described above) for social devices, including legacy devices that might otherwise require human involvement. The firewall may be software-based (e.g., as part of an operating system), or comprise various combinations of software, firmware and/or hardware components. In addition, the gateway may include bifurcated firewall functionality for connections to SNET circles/sub-circles and remote devices, respectively.

When SNET circle membership is restricted, a local or cloud-based registrar can be employed to provide authentication services (using a directory service, for example). The registrar may be located in or on either side of the gateway, including after firewall, or it may operate independently of a gateway. Further, the registrar might provide registration functions for both the social device and/or a remoter user/device.

When docking with an IP-based SNET circle, the social device 1002 may broadcast profile data to the local domain using a textual data format such as Extensible Markup Language (XML). Upon successful docking of a new social device, a SNET circle node (e.g., docking module) provides authorized access to SNET circle. It is contemplated that the social device may simultaneously participate in more than one SNET circle.

As noted, SNET circle resources and social devices may be accessible via a zero configuration, multicast discovery protocol that locates devices and the services offered by those devices on a local network using a related service records or profiling information. Such a protocol may operate at the application layer. Wide area service discovery of SNET circle resources configured in this manner may be enabled through an appropriately configured domain name service (DNS) server.

SNET circle communications in accordance with the disclosure may utilize a variety of transmission protocols. By way of example, most communication over the Internet is currently performed in accordance with the Transmission Control Protocol (TCP) and User Datagram Protocol (UDP). As is known, TCP typically provides an intermediate level of communication services between, for example, an application program and the Internet Protocol (IP). Port numbers are used to identify end-points for sending and receiving applications on a host (often referred to as "Internet sockets" or "network sockets"). Internet sockets facilitate delivery of incoming data packets to an appropriate application process or thread, as determined by a combination of local and remote (e.g., SNET circle) IP addresses and port numbers. In some embodiments, the Real-time Transport Protocol (RTP) running over UDP may be employed for video streaming applications, real-time multiplayer gaming, voice over IP (VoIP), and like applications that are tolerant of a certain level of packet loss and may not require a dedicated end-to-end-connection.

A member of a SNET in accordance with various embodiments of the disclosure such as those disclosed herein may establish permissions and/or privacy settings that control and restrict who or what may access the member's profile(s) information, connections and circles, as well as define desired degrees of access. Permissions may enable the user to maintain certain information as private or available on a permissive basis only. For example, visibility of specified user information may be limited to users/devices in a SNET(s). Alternatively, specified user information may be publicly available. Likewise, a SNET member may selectively decide to permit others to access personal information such as name, gender, contact information/email address, etc.

Figure 17:
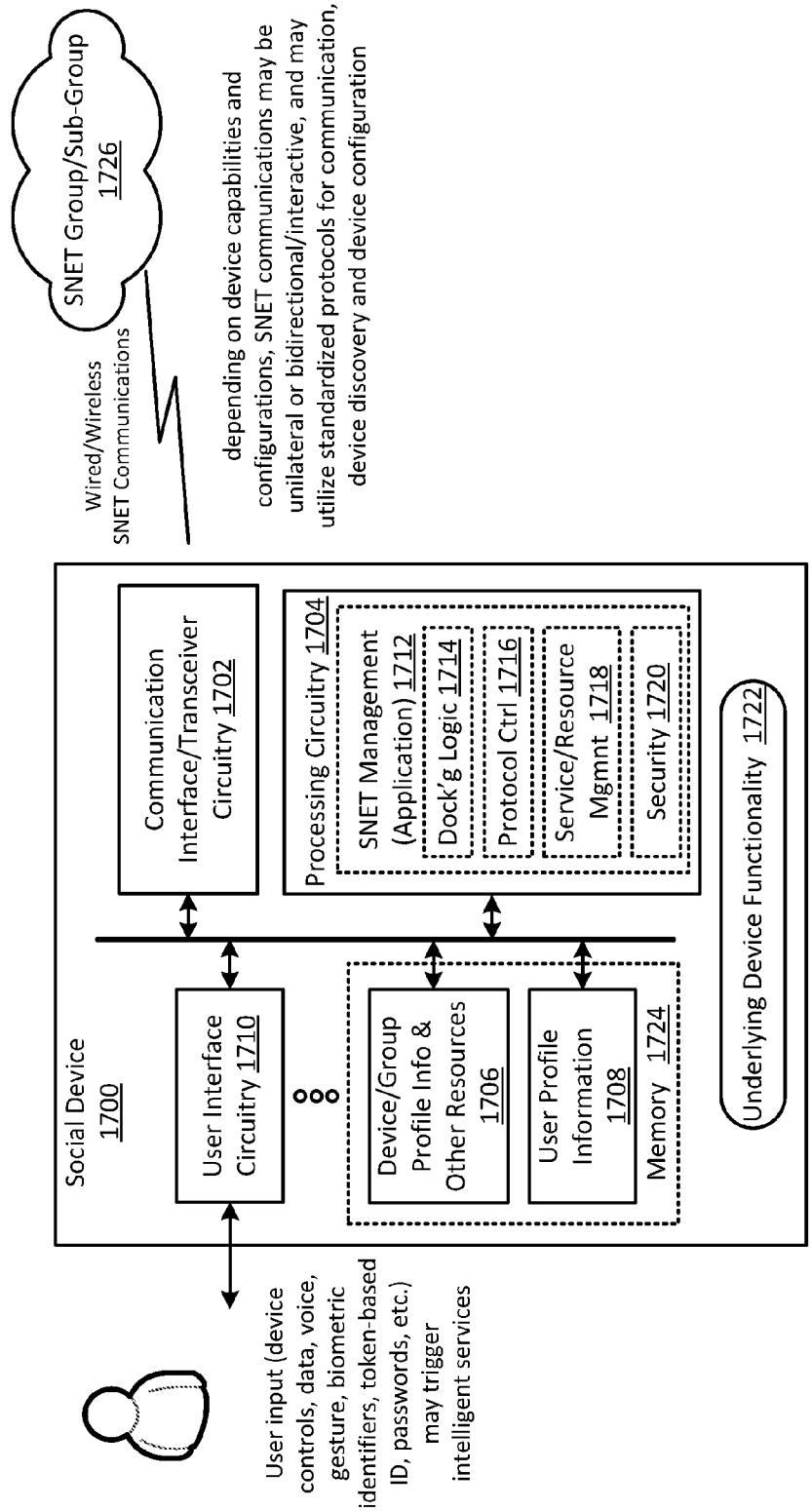
FIG. 17 is a schematic block diagram of an embodiment of a social device comprising integral functionality operable to support social network circle/sub-circle membership and communications in accordance with the disclosure.

FIG. 17 is a schematic block diagram of an embodiment of a social device comprising integral functionality operable to support social network circle/sub-circle membership and communications in accordance with the disclosure. In the illustrated embodiment, a communication interface and transceiver circuitry 1702 is operable to perform wired or wireless communications between the social device 1700 and a SNET group/sub-group 1726 over one or more communication channels. Depending on the capabilities and configuration of the social device 1700, communications with a SNET may be unilateral or bidirectional/interactive, and utilize either a proprietary or standardized communication protocol. Communications may include, for example, device profile information, user and SNET circle profile information, control signals, audio/video content, interactions with hosted service data, user data, relayed information, etc.

The social device 1700 further includes processing circuitry 1704 operable to process and manage communications, services and associations between the device and other entities including members of a SNET group/sub-group 1724, third parties, software agents, etc. More particularly, the processing circuitry 1704 may include, for example, a software management application 1712 comprising one or more of docking logic 1714 (including support for device discovery and configuration protocols such as described below), communication protocol control 1716, service and resource management 1718, and security/authentication 1720 functionality.

The social device 1700 further may utilize that may take many forms and be maintained in static or dynamic memory 1724. Such profile information enables a social device and/or user to present an image of itself and its capabilities to other members of a SNET. In particular, device/group profile information and other resources 1706 and user profile information 1708 may be utilized in various ways in accordance with the disclosure to facilitate a variety of social interactions. Depending on the capabilities and requirements of a particular device (and other members of a SNET), a device or user profile may be static or dynamic.

In certain embodiments, the social device 1700 may interact with a user(s) via user interface circuitry 1710. User input to the social device 1700 may include, for example, data entry through a keypad, touchscreen, remote control device, gaming controller, device control buttons, voice or gesture commands, storage device, etc. For example, voice or gesture commands may be utilized to trigger intelligent services. Authorized access to or control of the social device 1700 can be facilitated through unique biometric identifiers, passwords, token-based identification, trusted authorities or documents such as a driver's license or passport, and like authentication means.

The social device 1700 may perform core or underlying functionality 1720, (e.g., a social appliance, security device, vehicular communication node, etc.). Alternatively, the social device may primarily function as a social networking interface or communication device, or be programmable to perform specific functions within a SNET group/sub-group.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A social network infrastructure used with a plurality of devices, the social network infrastructure comprising:
    processing circuitry configured to implement:
        a membership management module that manages membership related to a plurality of social groups that includes a first social group, the first social group including the plurality of human members and a plurality of non-human members, the plurality of non-human members including the plurality of devices, the membership management module establishing membership of the non-human members that is separate and apart from membership of the human members;
        a docking module that manages docking of non-human members to the first social group; and
        a support service to support a first of the plurality of human members in adding a selected service as a non-human member of the first social group via the docking module.

2. The social network infrastructure of claim 1, the selected service selected from the group consisting of: an artificial intelligence function, a payment service, and a robotic control service.

3. The social network infrastructure of claim 1, wherein the docking module comprises at least one security-related access condition.

4. The social network infrastructure of claim 1, wherein the selected service is provided by a supporting system.

5. The social network infrastructure of claim 1, further comprising a server system, the membership management module executed by the server system.

6. The social network infrastructure of claim 1, wherein the selected service is provided, at least in part, by a first of the plurality of devices.

7. The social network infrastructure of claim 6, wherein a second device of the plurality of devices provides a visual offer of services available to the first social group.

8. The social network infrastructure of claim 1, the support service comprising an interface that offers the first of the plurality of human members a selection of services to add as a non-human member of the first social group.

9. Device circuitry used to interact with a social network system, the social network system hosting a plurality of social groups, the device circuitry comprising:
    interface circuitry operable to couple with the social network system;
    processing circuitry coupled with the interface circuitry to support secure interaction with a social service associated with the social network system; and
    the secure interaction comprising interaction regarding social group membership and social service access rights, the processing circuitry configured to service the secure interaction to establish membership of the device circuitry within a social group that is separate and apart from membership of human members within the social group.

10. The device circuitry of claim 9, the secure interaction further comprising interaction with an artificial persona associated with social network system.

11. The device circuitry of claim 9, the social service docked as a member of a social group of the social network system.

12. The device circuitry of claim 9, the plurality of social groups comprising a plurality of device members, the social service provided by at least one of the device members.

13. The device circuitry of claim 9, the social service comprising payment services.

14. System circuitry used to interact with a social network system, the social network system hosting a plurality of social groups, a first group of the plurality of social groups having a user device member, the system circuitry comprising:
    interface circuitry operable to couple with the social network system;
    processing circuitry coupled to the interface circuitry;
    the processing circuitry configured to establish membership of the system circuitry within a social group that is separate and apart from membership of human members within the social group; and the processing circuitry configured to assist in providing a social service to the user device member.

15. The system circuitry of claim 14, the social service being offered via the first group.

16. The system circuitry of claim 15, the social service hosted by a second user device member.

17. The system circuitry of claim 16, the processing circuitry providing access to the social service upon docking of the second user device as a member of the first group.

18. The system circuitry of claim 14, the processing circuitry providing access to the social service upon docking of the social service as a member of the first group.

19. The system circuitry of claim 14, the social service comprising a distributed process.

20. The system circuitry of claim 14, the social service comprising social billing and payment elements.

* * * * *